US007270125B1

(12) United States Patent
Jordan

(10) Patent No.: US 7,270,125 B1
(45) Date of Patent: Sep. 18, 2007

(54) COMBINED AIRCREW SYSTEMS TESTER (CAST)

(75) Inventor: Clifford L. Jordan, Park Ridge, IL (US)

(73) Assignee: Scot Incorporated, Downers Grove, IL (US)

( * ) Notice: Subject to any disclaimer, the term of this patent is extended or adjusted under 35 U.S.C. 154(b) by 284 days.

(21) Appl. No.: 10/898,588

(22) Filed: Jul. 26, 2004

Related U.S. Application Data

(62) Division of application No. 10/208,188, filed on Jul. 31, 2002, now Pat. No. 6,820,616.

(60) Provisional application No. 60/308,846, filed on Aug. 1, 2001.

(51) Int. Cl.
  *A62B 17/00* (2006.01)
(52) U.S. Cl. .................. 128/202.11; 600/19; 600/20
(58) Field of Classification Search ............ 128/202.11, 128/202.12, 202.13, 202.19, 201.19, 206.21, 128/206.24, 206.23, 202.22, 205.26; 454/255, 454/256; 600/19, 20; 2/2.14
  See application file for complete search history.

(56) References Cited

U.S. PATENT DOCUMENTS

| | | | | |
|---|---|---|---|---|
| 4,230,097 A | * | 10/1980 | Beaussant et al. ............ 600/19 |
| 4,336,590 A | * | 6/1982 | Jacq et al. ............ 128/204.21 |
| 4,906,990 A | * | 3/1990 | Robinson .................... 340/945 |
| 5,199,426 A | * | 4/1993 | Aldworth et al. ....... 128/205.24 |
| 5,318,018 A | * | 6/1994 | Puma et al. ........... 128/202.11 |
| 5,536,232 A | * | 7/1996 | Farrell et al. ................. 600/19 |
| 6,805,121 B1 | * | 10/2004 | Flood et al. ........... 128/204.26 |

* cited by examiner

*Primary Examiner*—Steven O. Douglas
(74) *Attorney, Agent, or Firm*—Robert E. Bushnell, Esq.

(57) ABSTRACT

The invention enables testing of nearly all aircrew equipment including COMBAT EDGE system components which include a mask, a G-suit, communication systems, and a goggle. A gas system includes an input filter, a first compressor comprising at least one blower, preferably three blowers connected in series, a second compressor, a first flow sensor, a second flow sensor, a first flow valve, a second flow valve, a regulator, a first pressure sensor, a second pressure sensor, a first pressure valve, a second pressure valve, and a controller. The second compressor produces a lower flow at a higher pressure than the first compressor. When the G-suit inflates, initially there is a large change in volume without much change in pressure, and then, as the G-suit fills and becomes firm, the change in volume slows down and the rate of the pressure increases. A normal breathing test, a preflight test, a fit test, a G-suit leak test and two dynamic flow leak tests are conducted.

18 Claims, 21 Drawing Sheets

COMBINED AIRCREW SYSTEMS TESTER (CAST)

CROSS-REFERENCE TO RELATED APPLICATIONS

This application is a divisional application of U.S. patent application Ser. No. 10/208,188 filed on 31 Jul. 2002 now U.S. Pat. No. 6,820,616. This related application is relied on and incorporated herein by references in its entirety.

CLAIM OF PRIORITY

This application makes reference to, incorporates the same herein, and claims all benefits accruing under 35 U.S.C. § 119 from a provisional application entitled *Combined Aircrew Systems Tester (CAST)* filed in the United States Patent & Trademark Office on 1 Aug. 2001, and there duly assigned Ser. No. 60/308,846 by that Office.

BACKGROUND OF THE INVENTION

1. Field of the Invention

The present invention relates to a combined aircrew systems tester, and more particularly, to a combined aircrew systems tester enabling functional testing of aircrew equipment.

2. Description of the Background Art

Life support systems are very crucial for members of an aircrew of aircraft and especially high performance aircraft. Life support systems include COMBAT EDGE (combined advanced technology enhanced design G-ensemble) system components. The system includes a G-suit, an oxygen mask, goggles, and a communication equipment. Specifically, the COMBAT EDGE system includes the MBU-20/P Oxygen Mask, CSU-17/P Vest Assembly, HGU-55/P Helmet with occipital bladder, CRU-94/P Integrated Terminal Block or PBG (pressure breathing for Gs) Chest Mounted Regulator or both CRU-94/P Integrated Terminal Block and PBG Chest Mounted Regulator, and all associated Anti-G garments.

Life support systems are very important for the aircrew and therefore, it is extremely important that such vital systems be properly tested. If any of the above systems do not work, a pilot for instance may be unable to control the aircraft.

Earlier systems had different testing units for each type of life support. A separate cumbersome unit would be needed for testing an oxygen mask and another separate large unit would be needed for testing the anti-G suit. This is expensive and very awkward for users to test their equipment at different stations while for instance they are wearing such equipment. Moreover, the power sources for such equipment are usually not commonly available because of the high power necessary to drive such complicated devices.

Particularly, a conventional tester for an oxygen mask requires a separate high pressure source of breathing air/oxygen. It is awkward for users to bring the tester and the separate high pressure source.

For the foregoing reasons, there is a need for a tester that can be inexpensively and efficiently test life support equipment.

SUMMARY OF THE INVENTION

It is therefore an object of the present invention to have an integrated unit that can functionally test the various aircrew equipment.

It is another object to have an aircrew systems tester that can test all of the aircrew life support equipment and communication systems.

It is yet another object to have a unit that can test the aircrew life support equipment and yet not require much power for operation.

It is still yet another object to have a unit that tests the aircrew life support equipment and yet not require high pressure air/oxygen cylinders.

It is still another object to have a unit that tests the aircrew life support equipment and significantly reduces supporting man-hours, deployment costs and mobility footprint.

It is still further another object to have a life support system tester that is able to operate in a chemical warfare environment.

To achieve the objectives of the present invention, there is provided a tester including a gas system which includes an input filter located in an inlet port, the input filter filtering an air to prevent foreign particles from entering the gas system, a first compressor compressing the air, the first compressor comprising at least one blower, a speed of the blower depending on a voltage applied to the blower, a second compressor compressing the air, the second compressor producing a lower flow than the first compressor, the second compressor producing a higher pressure than the first compressor, a first flow sensor detecting a flow of the compressed air and a leaking of the aircrew systems, a second flow sensor detecting the flow of the compressed air and the leaking of the aircrew systems, a first flow valve mounted for controlling the flow of the compressed air to the first flow sensor, a second flow valve mounted for controlling the flow of the compressed air to the second flow sensor, a regulator regulating a pressure of the second system, a first pressure sensor detecting a pressure of the mask, a second pressure sensor detecting the pressure of the second system, a first pressure valve for controlling the pressure of the first system, a second pressure valve for controlling the pressure of the second system, and a controller controlling an operation of the gas system. The inlet filter designed to accept a C2 (chemical) filter. The gas system is particularly suitable for testing a mask and a G-suit. It is preferred that the first compressor comprises three regenerative blowers, a first blower, a second blower, and a third blower, connected in series. It is preferred that each of the three regenerative blowers has 21 inch $H_2O$ of a maximum output pressure. In a preferred embodiment, the first compressor compresses the air until a G-suit pressure reaches 55 inch $H_2O$, the second compressor starts to compress the air when the G-suit pressure is about 55 inch $H_2O$ and finishes when the G-suit pressure is about 70 inch $H_2O$. The first flow sensor is able to measure the flow from 0 to 10,000 cc/min (cubic centimeters per minute), and the second flow sensor is able to measure the flow 0 to 300 cc/min. The first flow valve and the second flow valve determine which sensor is used. The gas system further includes a digital indicator reading out data outputted from the first and second flow sensors. The gas system further includes a first limit valve for limiting a pressure of the first system. The operation of the gas system is controlled by a main printed circuit board (PCB) which uses CMOS (complementary metal oxide semiconductor) logic. The present invention further includes a speed control printed circuit board (PCB) which controls the first compressor by controlling a voltage applied to the second first compressor.

The tester of the present invention includes a first unit for testing a mask, a second unit for testing a G-suit, and a third unit for testing a communication system. The tester can further includes a fourth unit for testing a goggle. Since the tester of the present invention is self contained and integrated, a control panel of the tester of the present invention has a plurality of switches and indicators for controlling the tests for the life support systems of an aircrew member. The third unit preferably includes an input accommodating a microphone, an input accommodating headset, and two inputs for carbon microphones. The third unit further includes a built-in continuity tester. The third unit can further includes an accommodation of a second headset and microphone accommodating a first user to communicate with a second user.

A method of operating a gas system for testing aircrew systems which includes a mask and a G-suit is comprised of the steps of selecting a test mode between the test mode for the normal breathing and the test mode for the PBG breathing, filtering an ambient air with a C2 filter, compressing the air, detecting a flow of the air, and detecting a pressure of the mask or G-suit. When the mask test mode is selected, the step of compressing the air further includes the step of turning on the first compressor. When the PBG mode test is selected, the step of compressing the air further includes the steps of turning on the first compressor until a G-suit pressure reaches 55 inch $H_2O$, turning off the first compressor and turning on the second compressor when the G-suit pressure is about 55 inch $H_2O$, and turning off the second compressor when the G-suit pressure is about 70 inch $H_2O$. The first compressor is controlled by adjusting a voltage applied to each of the first, second, and third blowers and by deciding how many blowers are turned on.

With this configuration, the present invention enables functional testing of nearly all aircrew equipment including the COMBAT EDGE (Combined Advanced Technology Enhanced Design "G" Ensemble) system components.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The present invention is an integrated unit that can functionally test the various aircrew equipment. Life support systems include COMBAT EDGE (combined advanced technology enhanced design G-ensemble) system components. The system includes the MBU-20/P Oxygen Mask, CSU-17/P Vest Assembly, HGU-55/P Helmet with occipital bladder, CRU-94/P Integrated Terminal Block or PBG (pressure breathing for Gs) Chest Mounted Regulator or both CRU-94/P Integrated Terminal Block and PBG Chest Mounted Regulator, and all associated Anti-G garments.

Figure 1:
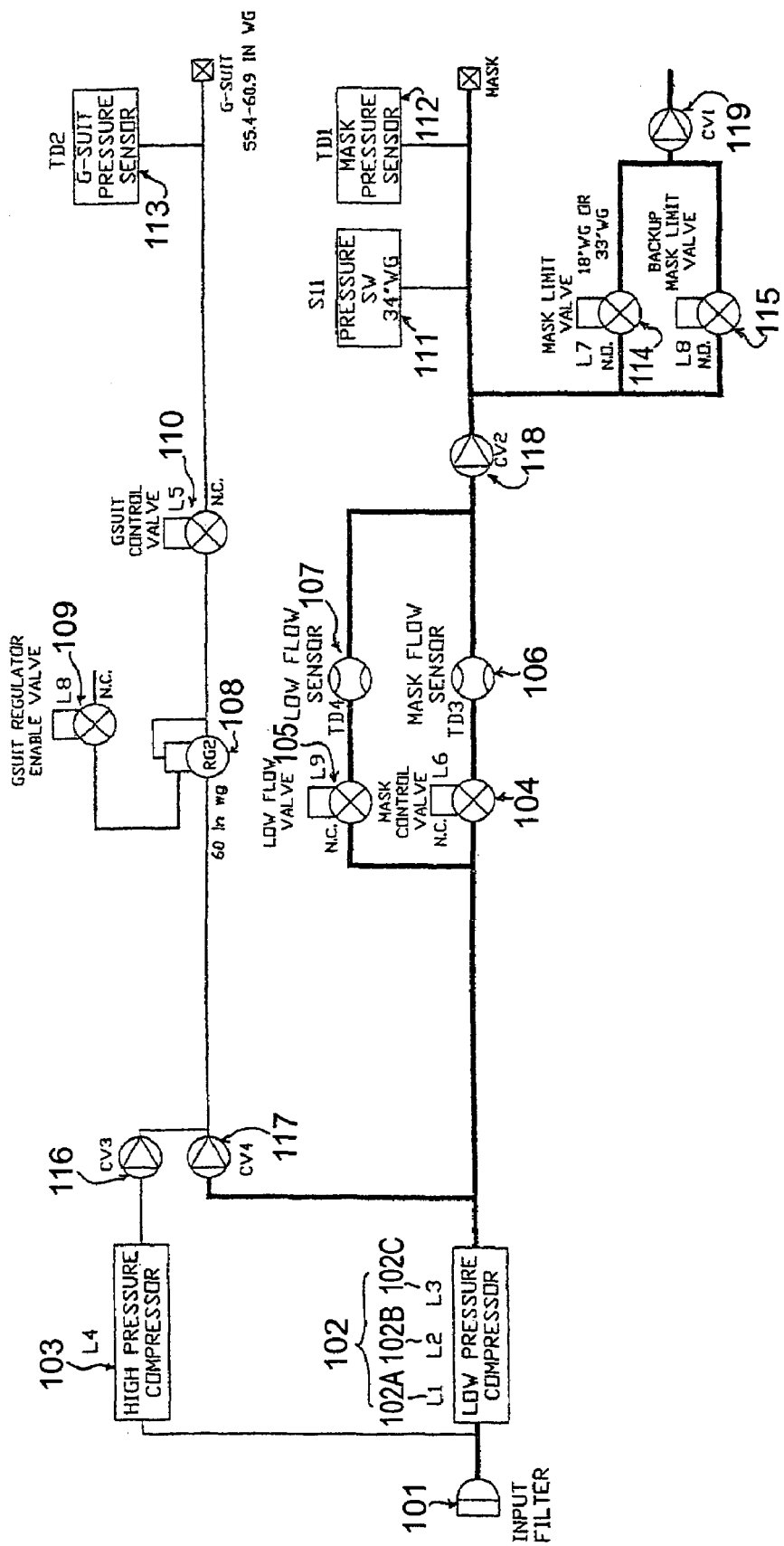
FIG. 1 illustrates a functional diagram of a gas system of the present invention.

A functional diagram of a gas system for a combined aircrew system tester (CAST) is shown in FIG. 1.

The gas system of the tester provides two air sources. One is for a mask or a vest, and the other is for a G-suit (a suit designed to counteract the physiological effects of acceleration on an aviator or astronaut—called also called an anti-G suit). The air for the G-suit is provided through a G-suit port and the air for the mask/vest through the mask port. These air sources are used to perform maintenance and preflight testing of the pilot's life support equipment. The mask port air is used to test the pilot's oxygen mask and COMBAT EDGE gear. There are two modes of mask testing, 'normal' and 'PBG' (Pressure Breathing for G (acceleration force of gravity)).

Referring to FIGS. 1 through 4, air for the mask starts by passing through an input filter 101. The ambient air is inputted through an inlet port. A screen mesh filter assembly screws into the inlet port to prevent particles from entering the air stream. The thread on the inlet port is designed so that it can accept a C2 (chemical) filter 246 used for chemical warfare. This feature makes it possible to use the tester in a chemical environment. All the air outputted by the tester passes through the C2 when it is installed.

Then, the air for the mask is compressed by a low-pressure compressor system 102.

The low-pressure compressor system 102 includes at least one blower but preferably includes at least three regenerative blowers 102a, 102b and 102c connected in series to generate the necessary pressure and flow. The output pressure is determined by the speed of the blowers 102a, 102b and 102c and how many blowers 102a, 102b and 102c are turned on. The voltage applied to each of the blowers 102a, 102b and 102c controls the speed. If the voltage decreases, the speed decreases and the output pressure is decreased. The voltage is controlled by a speed control circuit, which is part of the speed control PCB (Printed Circuit Board, PCB3).

Then, the air for the mask passes through one of two flow sensors 106, 107, which are used to alert the user that his or her equipment is leaking and to measure the leak rate. One flow sensor is a high flow sensor 106 which measures flow from 0 to 10,000 cc/min (cubic centimeters per minute) and the other flow sensor is a low flow sensor 107 which measures flow from 0 to 300 cc/min. A mask control valve 104 and a low flow valve 105 determine which sensor is used. One of two valves 104 and 105 which are normally closed is open to permit the air to flow through one of the flow sensors 106 and 107. The output from the flow sensor 106 or 107 is fed into a digital indicator 274 (FIG. 2) to indicate flow. The indicator 274 reads out in the appropriate units. Its range is set by an embedded processor on a main PCB (Printed Circuit Board, PCB1).

These sensors are excited with 10.0 VDC (voltage of direct current). At zero flow their output is 1.0 VDC (voltage of direct current). At full scale the output is 5.0 VDC (voltage of direct current). The low flow sensor 107 is not quite linear. To compensate for this, five linear curves are fitted to the flow versus voltage curve. The slopes of these five curves are programmed into the digital indicator 274 that is used to indicate flow.

Next, the air passes through a check valve 118 and flows out the mask port 242. The check valve 118 prevents foreign materials from entering the gas system of the tester. A pressure switch 111 and a mask pressure sensor 112 monitor the mask port pressure. They are used to control and limit the mask port pressure. The mask pressure sensor 112 converts pressure to voltage. The voltage is fed into the digital indicator 270 where it is converted to a digital signal, which is presented as number scaled in engineering units. This number is updated 13 times a second. The indicator has three logic high outputs, which output when the pressure exceeds their set pressure. In addition, the pressure switch 111 is connected to the mask pressure sensor 112. The pressure switch 111 is normally closed, and is preferably set to open at 18 in (inch) $H_2O$.

A mask limit valve 114 and a backup mask limit valve 115 are also provided for controlling the mask port pressure.

The air for the G-suit is produced by multiple compressors 102a, 102b, 102c and 103. At pressures below 55 in $H_2O$, the low-pressure compressor system 102 compress the air. At pressures above 55 in $H_2O$, a high-pressure compressor 103 compresses the air. This is done to minimize the amount of time to inflate the G-suit. The low-pressure compressors (with regenerative blowers) 102a, 102b and 102c produce high flow at relatively low pressures while the high-pressure compressor 103 produces low flow but can compress the air to a higher pressure. This combination works particularly well when inflating the G-suit because when the G-suit inflates, initially there is a large change in volume without much change in pressure, and then, as the G-suit fills out and becomes firm, the change in volume slows down and the rate the pressure increases.

A G-suit regulator enable valve 109 and a G-suit regulator 108 are provided for regulating the G-suit pressure. The G-suit regulator enable valve 109 is normally closed. When the G-suit pressure increases up to a certain pressure, the G-suit regulator enable valve 109 is opened to vent the G-suit regulator 108.

A G-suit control valve 110 is further provided for controlling the G-suit pressure.

With this configuration, the present invention does not require a separate high pressure source of breathing air and oxygen.

As explained above, the present invention is self contained. Thus, a control panel of the combined aircrew systems tester of the present invention has a plurality of switches and indicators for controlling the tests for the life support systems of an aircrew member.

Figure 2:
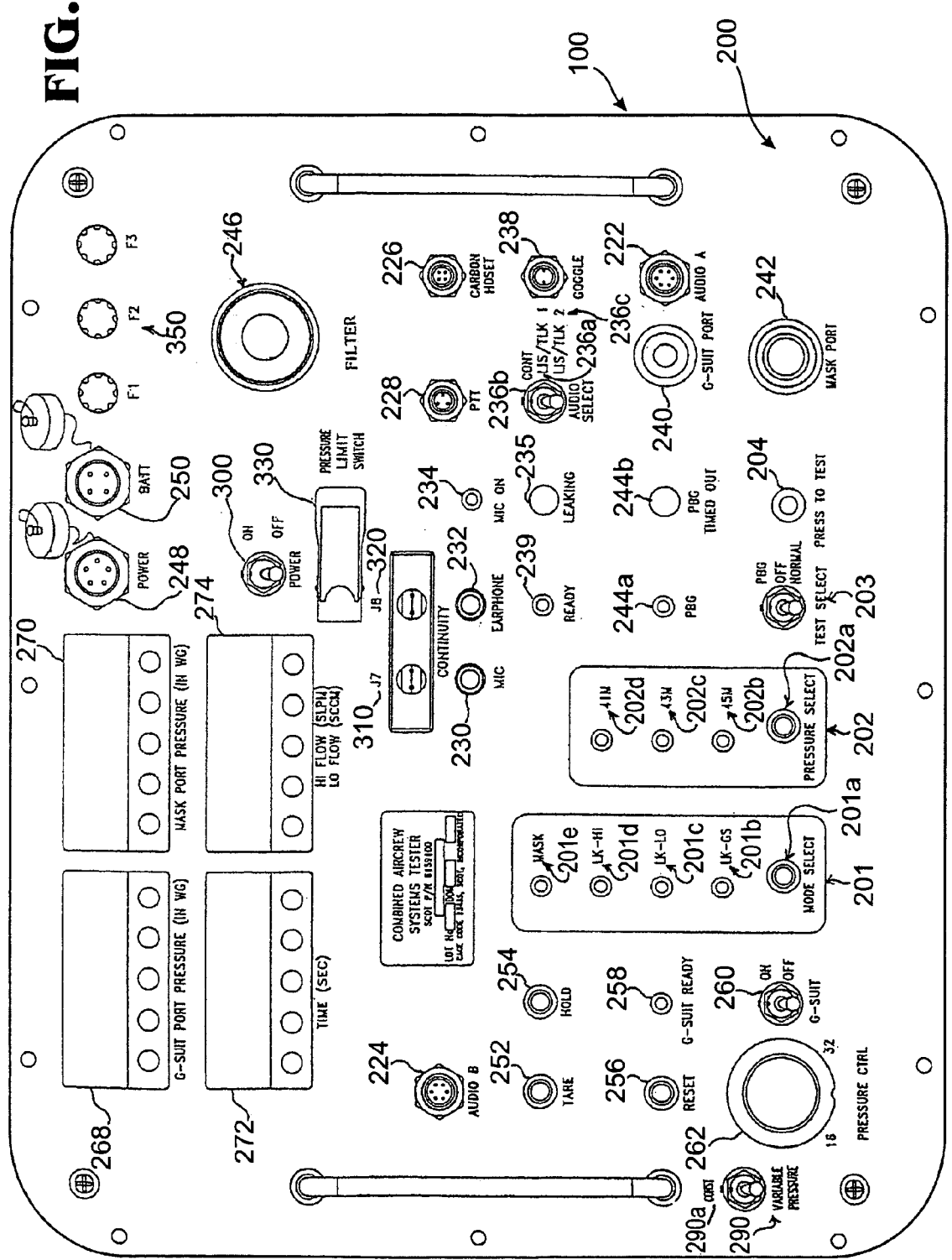
FIG. 2 illustrates the control panel of the present invention.
Figure 3:
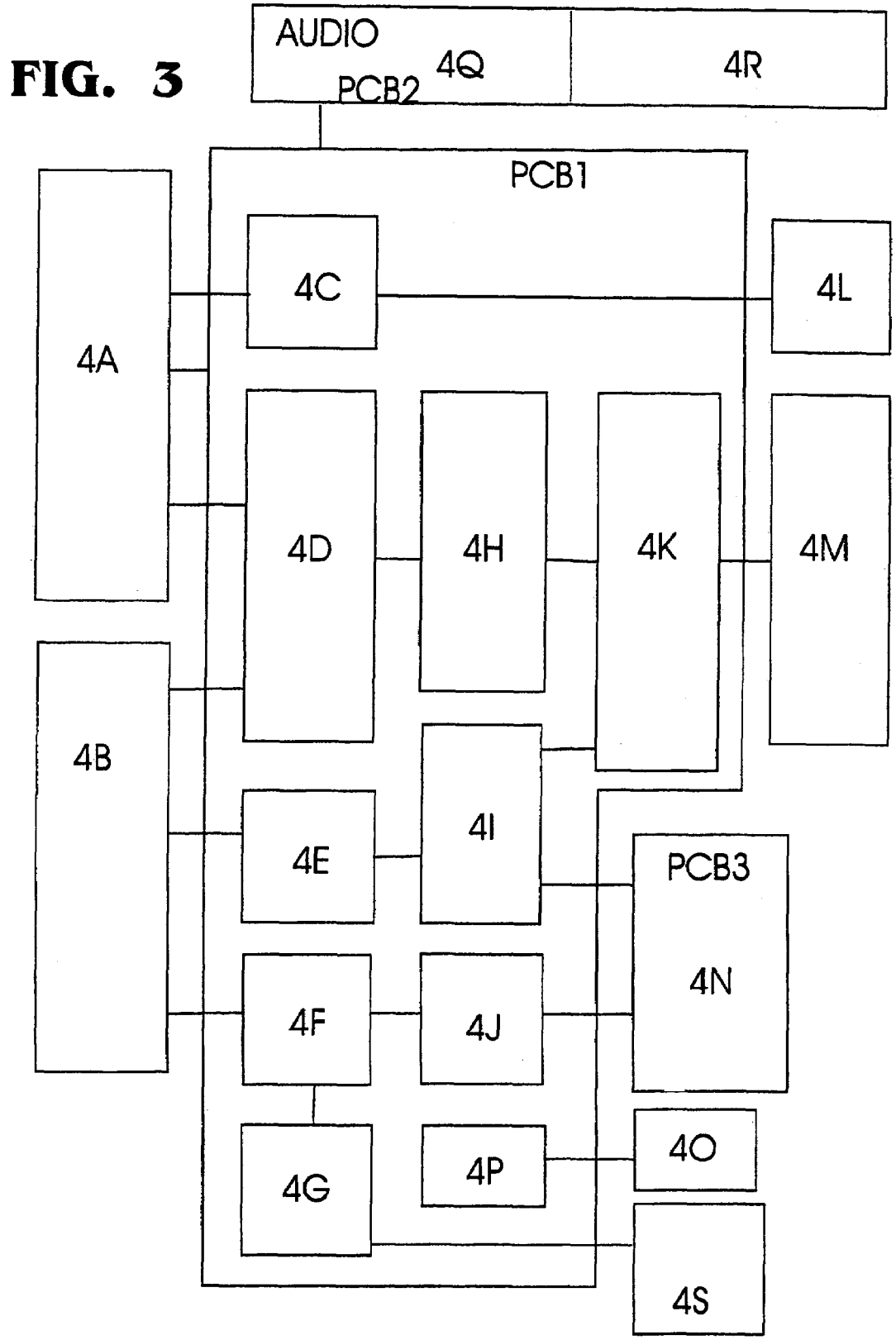
FIG. 3 illustrates an overall block diagram of the present invention.

FIG. 2 shows a preferred embodiment of the control panel.

As shown in FIG. 2, the control panel 200 includes a 'mode select' switch 201, a 'pressure select' switch 202, a 'test select' switch 203, and a 'press to test' switch 204.

The mode select portion 201 includes a mode select switch 201A preferably provides for two dynamic flow leak testing (high leak ('LK-HI') 201D and low leak ('LK-LO') 201C), a G-suit leak testing ('LK-GS') 201B, and one mask testing ('mask') 201E.

The pressure select switch 202 is preferably provided for 41M, 43M, or 45M (where M stands for 1000). Thus, the air is provided at one of four positive pressures; normal, 41M, 43M, or 45M.

The test select switch 203 provides for a PBG breathing testing ('PBG'), a normal breathing testing ('normal'), and 'off'. The test select switch 203 is preferably a three-position toggle switch. The test select switch 203 drives two debouncers 332, 334, the PBG and the normal logic steps.

A leaking indicator 235 is also included in the control panel 200.

The communication section includes audio input A 222 and B 224, a carbon headset input 226, a press to test ('PTT') jack 228, a continuity status of a microphone 230, a continuity status of the earphone 232, a microphone "on" indicator 234, an audio select switch 236 that can be switched to continuity test mode 236a, 'LIS/TLK 1' (listen/talk 1) 236b, or 'LIS/TLK 2' 236c. A port for the goggle 238 and a 'G-suit' button 240 are included along with a mask port 242. Indicators 244a and 244b relating to the PBG (pressure breathing for Gs) are also included. Reference 244b indicates that 'PBG timed out', 244a indicator concerns the 'PBG'. The control panel 200 also includes the filter 246. There are ports for the power 248 and the battery 250. A switch or indicator for tare 252 is along with a hold 254, and a reset 256 indicator or switch. A G-suit ready indicator 258 is also included along with a G-suit testing on/off switch 260 and a pressure control knob 262. The tester also includes a G-suit port pressure displays 268, a mask port pressure display 270, a time display 272, and a high and low flow display 274. The displays can be a digital display such as light emitting diodes, or liquid crystal display or other types of indicators.

The operation of the tester is explained in more details as follows.

To test the mask when the aircrew does not wear COMBAT EDGE, the user selects a mask mode of operation by pressing the mode select switch 201. The user selects a desired breathing pressure by pressing the pressure select switch 202. Then the test select switch 203 is toggled to the 'normal' position, which starts air flow out of the mask port at slight positive pressure. Then the press to test button 204 is pushed to cause the air pressure to increase to the pressure selected. The air is preferably provided at one of four positive pressures; normal, 41M, 43M, or 45M. When the mask mode has been selected and the test select switch is in the 'normal' position, the mask control valve 104 opens permitting the air to flow out the mask port. When operating in the normal mask mode, the air outputted through the mask port is provided at a pressure from 1 to 10 in $H_2O$.

The PBG (Pressure breathing for G) breathing is used to perform preflight tests and fit tests while the users are wearing COMBAT EDGE. The users wearing COMBAT EDGE are required to take the preflight test on their masks at PBG breathing pressure level. This test is performed at a breathing pressure of 16 in $H_2O$ with the G-suit not inflated. When the G-suit is not inflated, it is dangerous to breathe air at pressures much above 16 in $H_2O$. When the mode select switch 201 is set to 'mask' and the test select switch 203 is in the 'PBG' position, the air flows from mask port at normal pressure. When the press to test button 204 is depressed, the breathing pressure increases to 16 in $H_2O$. The user verifies that he or she is breathing normally, verifies proper mask functions and notes that their vest starts to inflate. Then the user momentarily stops breathing to test a leak. A light of the leaking indicator 235 will go out if there are no leaks greater than 5.5 lpm (liters per minute). When the press to test button 204 is pressed, the speed of the low-pressure compressor system 102 increases.

After a user is initially fitted with COMBAT EDGE equipment, a fit test is performed. This test is similar to the preflight test except the fit test is performed at 32 in $H_2O$.

The user has to be sitting down to perform this test. The fit test starts by performing the preflight test. Then the mask port pressure is increased slowly to 32 in $H_2O$ by adjusting the pressure control release and knob 262 until the air pressure reaches 32 in $H_2O$. Then the preflight test is repeated.

During preflight and fitting a red light turns on when flow exceeds 5.5 lpm. The user momentarily holds his or her breath to check for leaks. If there are no leaks, the leak light is turned off.

The voltage from the low flow sensor 107 is compared with a preset voltage that is equivalent to the sensor output when the flow is 5.5 lpm. When the voltage exceeds the preset voltage, the light of the leaking indicator 235 is turned on.

In order to do the preflight test safely, the G-suit has to be inflated. The low-pressure compressor system 102 and the high-pressure compressor 103 provide the air for the G-suit. When the G-suit switch 260 is turned on, the G-suit control valve 110 opens and the low-pressure compressor system 102 is turned on at its maximum operating speed so that the air rapidly fills the G-suit to its final approximate shape. When the G-suit pressure reaches 55 in $H_2O$, as sensed by G-suit pressure sensor 113, the high-pressure compressor 103 takes over filling the G-suit to its final pressure. The output of the G-suit pressure sensor 113 is fed into the digital indicator/controller 268. The indicator 268 turns the input voltage into a digital signal and processes it, rescaling it into engineering units and outputting it in the form of a number presented on the indicator. The G-suit pressure is maintained at 60 in $H_2O$ by the G-suit regulator 108. If the G-suit pressure exceeds 70 in $H_2O$, the high-pressure compressor 103 is turned off to limit the G-suit pressure to 70 in $H_2O$. After the G-suit pressure stabilizes at 60 in $H_2O$, the user turns off the G-suit switch 260.

The G-suit is periodically checked for leakage. To do this, the G-suit is pressurized to 138.4 in $H_2O$ (5 psi, pounds per square inch) and monitored for a change in pressure over an interval of time.

When the mode select switch 201 is in 'LK-GS' and the G-suit switch 260 is turned on, the G-suit regulator enable valve 109 is turned on to disable the G-suit regulator 108, allowing the G-suit pressure to rise to pressures greater than 60 in $H_2O$, which is a normal G-suit operating pressure. The high-pressure compressor is turned off at 138.4 in $H_2O$. When the pressure reaches 138.4 in $H_2O$, the power to the G-suit control valve 110 and the high-pressure compressor 103 is turned off to limit the pressure to 138.4 in $H_2O$. Once the pressure stabilizes, the user turns off the G-suit switch 260 to close off the G-suit. The tare switch 252 is pushed for zeroing the time and G-suit pressure. At 120 seconds the hold button 254 is pressed for holding the indicated change in time 8 and change in G-suit pressure. From these changes, the leak rate can be obtained.

When the mode select switch 201 is in the 'LK-HI' position (indicator 201D), the mask control valve 104 is opened. The low flow valve 105 remains off for directing all the flow through the high flow sensor 106.

When the mode select switch 201 is in the 'LK-LO' position (indicator 201C), the mask control valve 104 is closed. The low flow valve 105 is turned on for directing all the flow through the low flow sensor 107.

A second method used to verify the oxygen equipment seals is to measure a drop in pressure over an interval of time. The component under the test is attached to the mask port and is pressurized to 32 in $H_2O$ by setting the mode to 'mask' and the test select switch 203 to 'PBG'. The press to test button 204 is pushed and the pressure control knob 262 is adjusted until air pressure reaches 32 in $H_2O$. After the pressure has stabilized, the press to test button 204 is released to cut off the air source. The tare switch 252 is pressed to start a timer and zero the pressure indicator, 268 and 270. At a prescribed time the hold switch 254 is pressed to hold the timer and the pressure indicator readings. If the change in pressure is less than a prescribed amount in the prescribed time, the leak rate is within tolerance.

The present invention is designed to address safety issues with the following features.

When performing COMBAT EDGE testing, it is necessary to expose the user to excessive breathing pressures. Exposure to excessive breathing pressure can hurt the user. It is only safe under curtain conditions and for limited periods of exposure. Under no circumstance should the breathing air pressure exceed 34 in $H_2O$.

The present invention compresses the filtered ambient air to pressures close to the maximum allowable output mask pressure, while the conventional testers start with air that is compressed to pressures that are orders of magnitude greater than the maximum allowable output mask pressure. If the step down regulation system in the conventional pressures completely fails, the user is exposed to pressures that many times greater than what is safe. On the other hand, the user of the present invention would be exposed to pressures not higher than the maximum allowable mask output pressure.

As stated before, the blowers 102a, 102b, and 102c provide the breathing air. The maximum pressure that can be developed by each of the blowers 102a, 102b, and 102c is 21 in $H_2O$ when being driven by main power supply voltage at zero flow. If all pressure limiting systems were to fail, the maximum breathing pressure that could be developed to 63 in $H_2O$ at zero flow, which is comparable to the maximum safe pressure of 34 in $H_2O$. When the user is breathing, the pressure is significantly less.

Another safety feature of the present invention is a mask pressure limiting system. In the preflight test, if the pressure increases above 18 in $H_2O$, the power to the mask limit valve 114 is cut, venting the system through a check valve 119. This check valve 119 prevents back flow through the mask limit valve 114 when the user is inhaling. In addition, the mask port pressure is limited to 34 in $H_2O$ under all circumstances. The backup mask limit valve 115 operating current is passed through a pressure limit switch 111 set to open at 34 in $H_2O$. The backup mask limit valve 115 is a normally open valve. When the pressure limit switch 111 opens, the operating current is interrupted to open the backup mask limit valve 115.

Figure 4A:
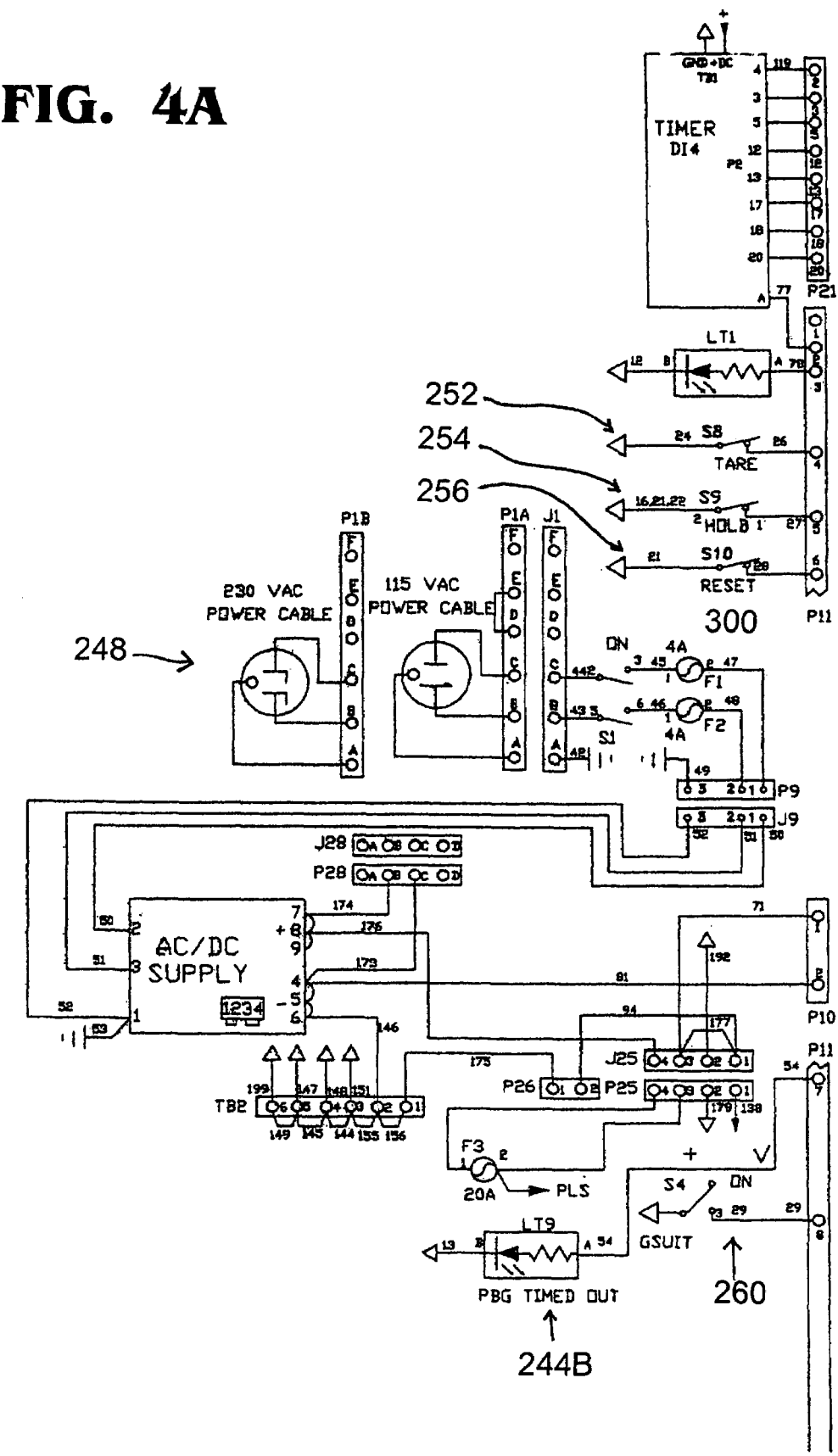
FIGS. 4A through 4S illustrate schematic diagrams of sections 4A through 4S, respectively of FIG. 3 of the present invention.
Figure 4B:
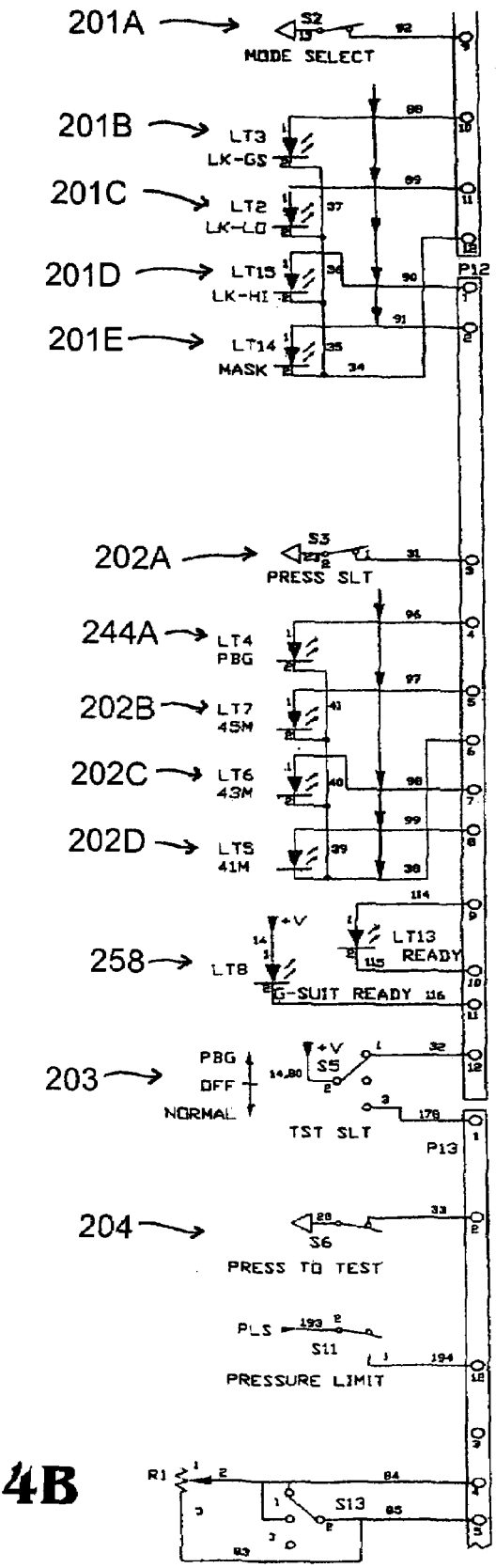
Figure 4C:
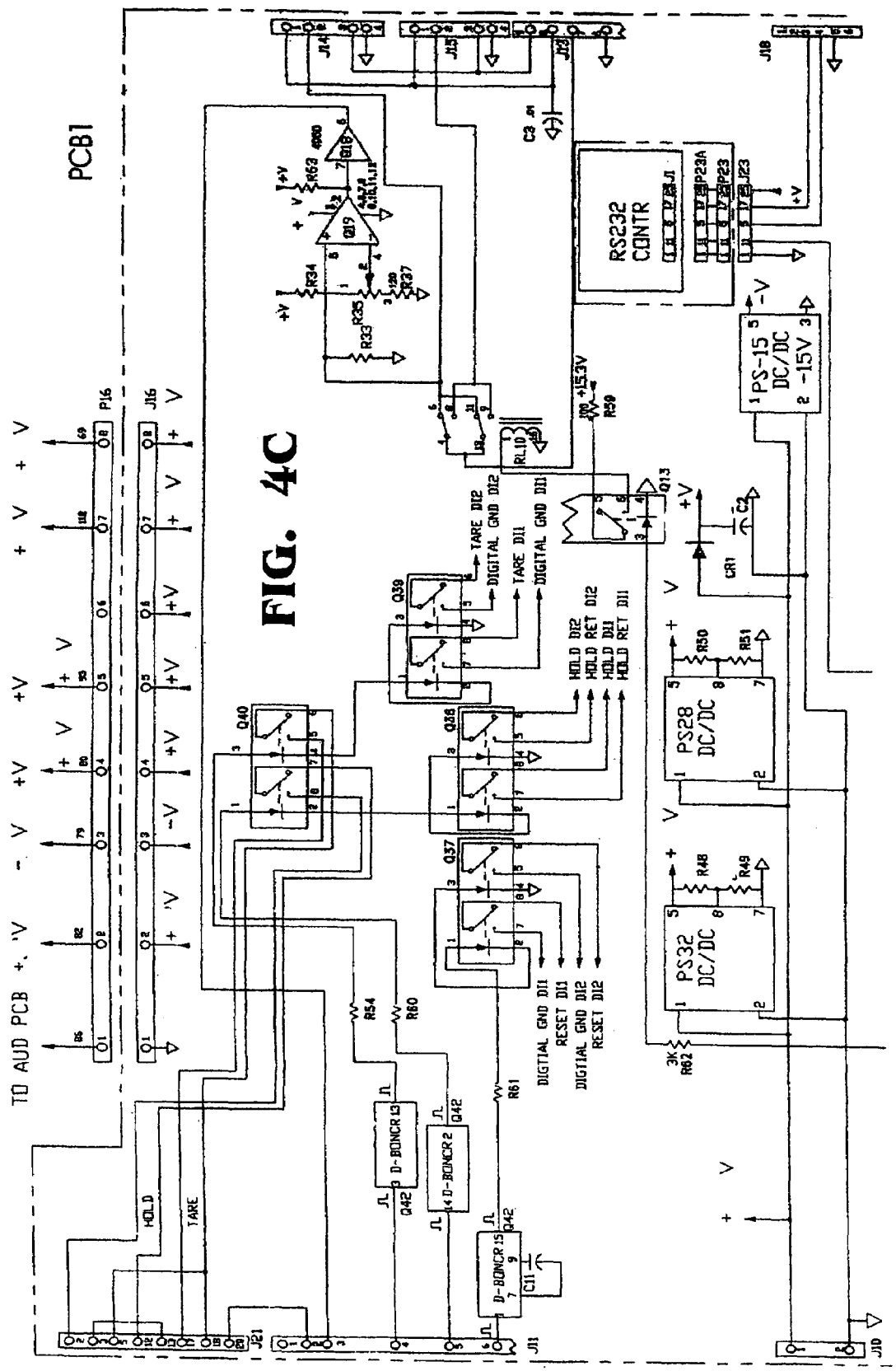

The method of controlling the CAST is described in more detail below. FIG. 4A through 4S illustrate schematic diagrams of sections 4A through 4S, respectively of the overall block diagram of FIG. 3 of the present invention. The schematics of 4A through 4S are sectioned to show the entire schematic of the present invention. Some portions may overlap in order to accurately show the connections between the individual elements.

The operation of the gas system is controlled by the main printed circuit board (PCB 1), which uses CMOS (complementary metal oxide semiconductor) logic to control the overall operation. There are two pressure sensors, two digital indicators, five switches and one potentiometer that input and drive the logic functions located on the main PCB (Printed Circuit Board, PCB1). The logic outputs control the speed control PCB (PCB3), and the valves that control flow.

All logic inputs are derived from either switch closures or TTL (transistor-transistor logic) located in the digital indicators. They pass through de-bouncers. The de-bouncers clean up these inputs and turning them into single pulse square waves with CMOS logic high levels.

The outputs refer to either compressor motors or valves. The valve outputs and the high-pressure compressor output are located on the main PCB (PCB1). They include an opto isolator and power relays. This is done to protect the CMOS logic from inductive spikes that occur when switching a valve. The high-pressure compressor output is located on the main PCB (PCB1) and the low-pressure compressors outputs are located on the speed control PCB (PCB3).

Figure 4D:
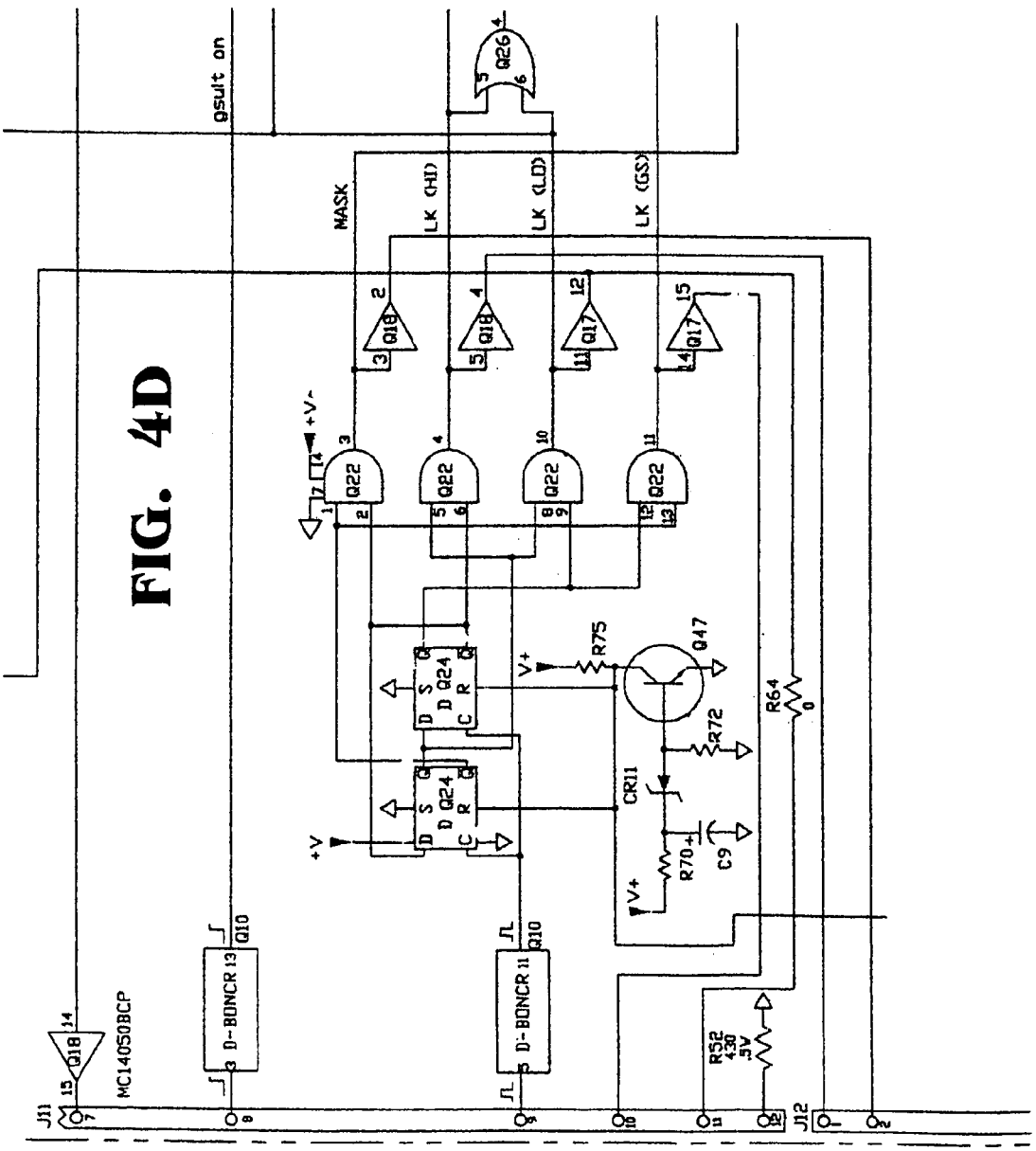
Figure 4E:
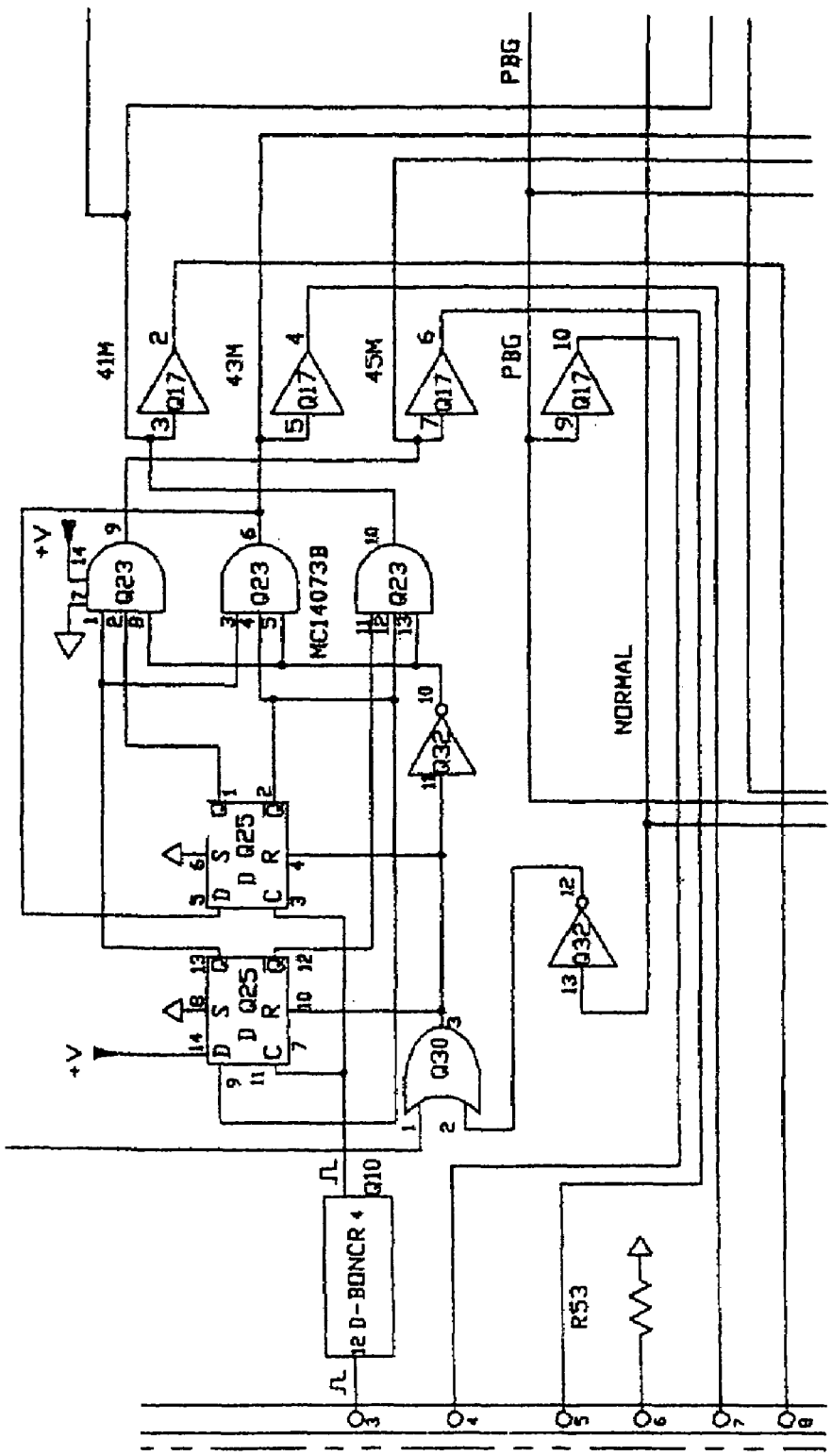
Figure 4F:
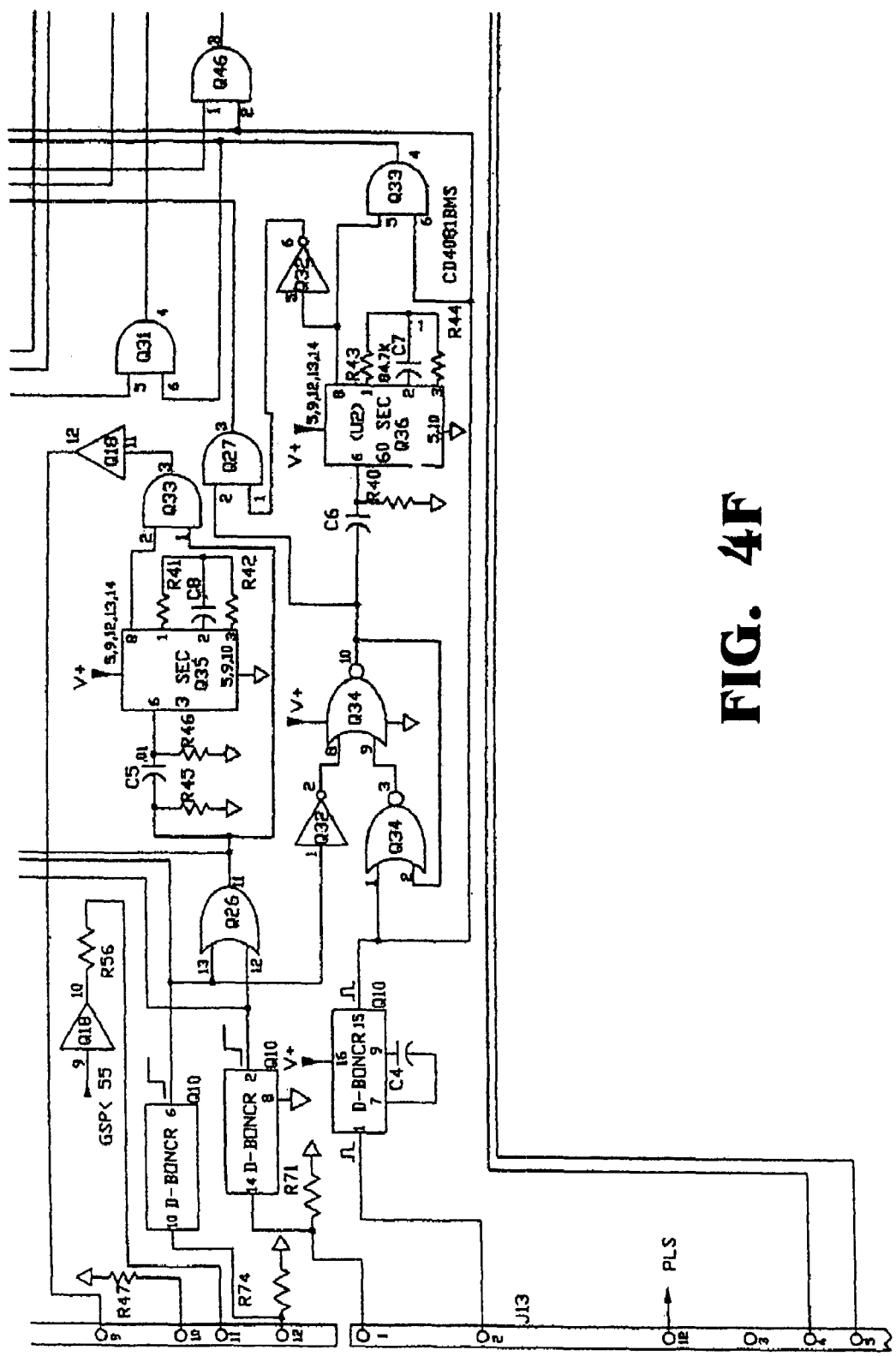
Figure 4G:
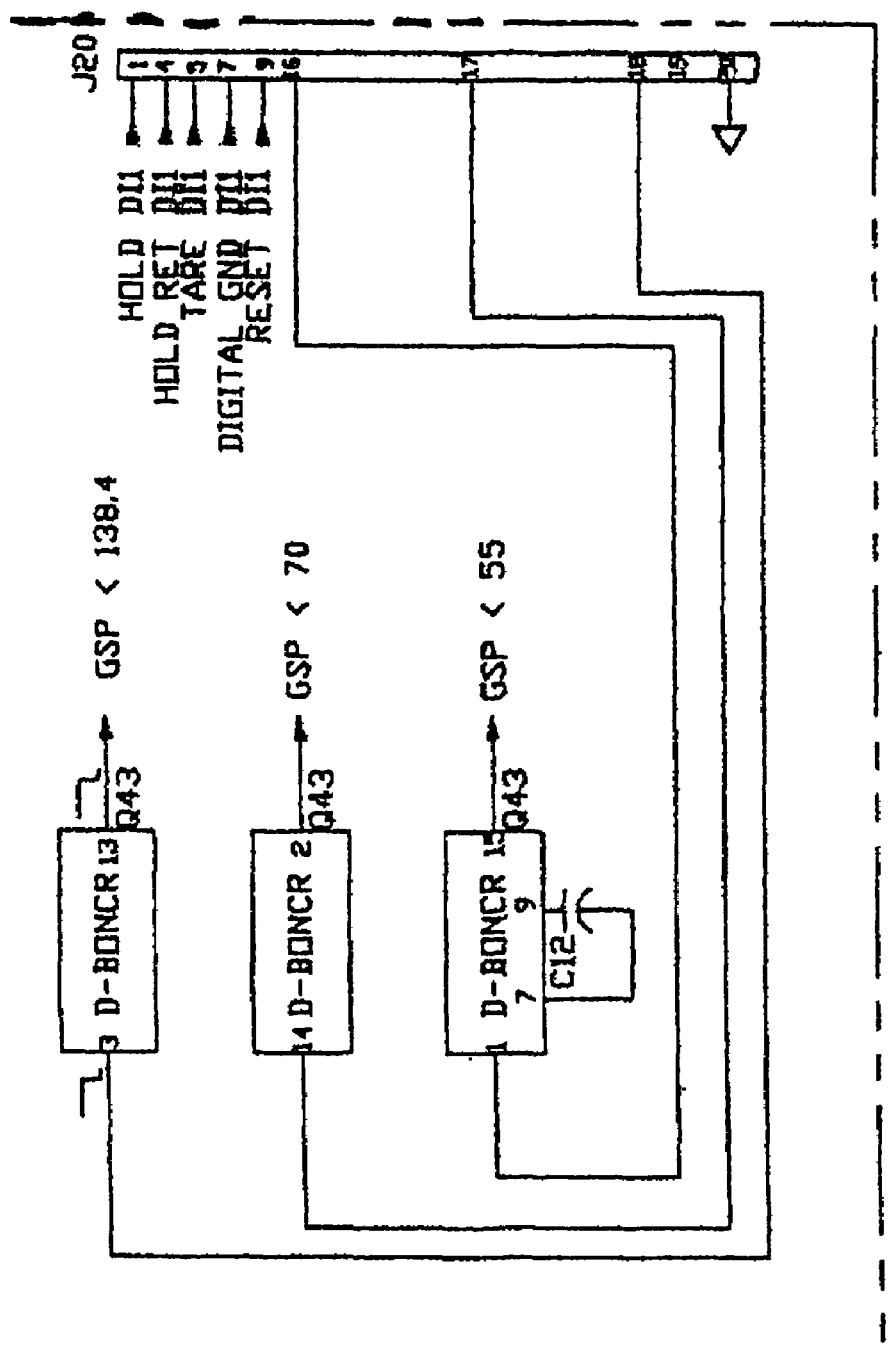
Figure 4H:
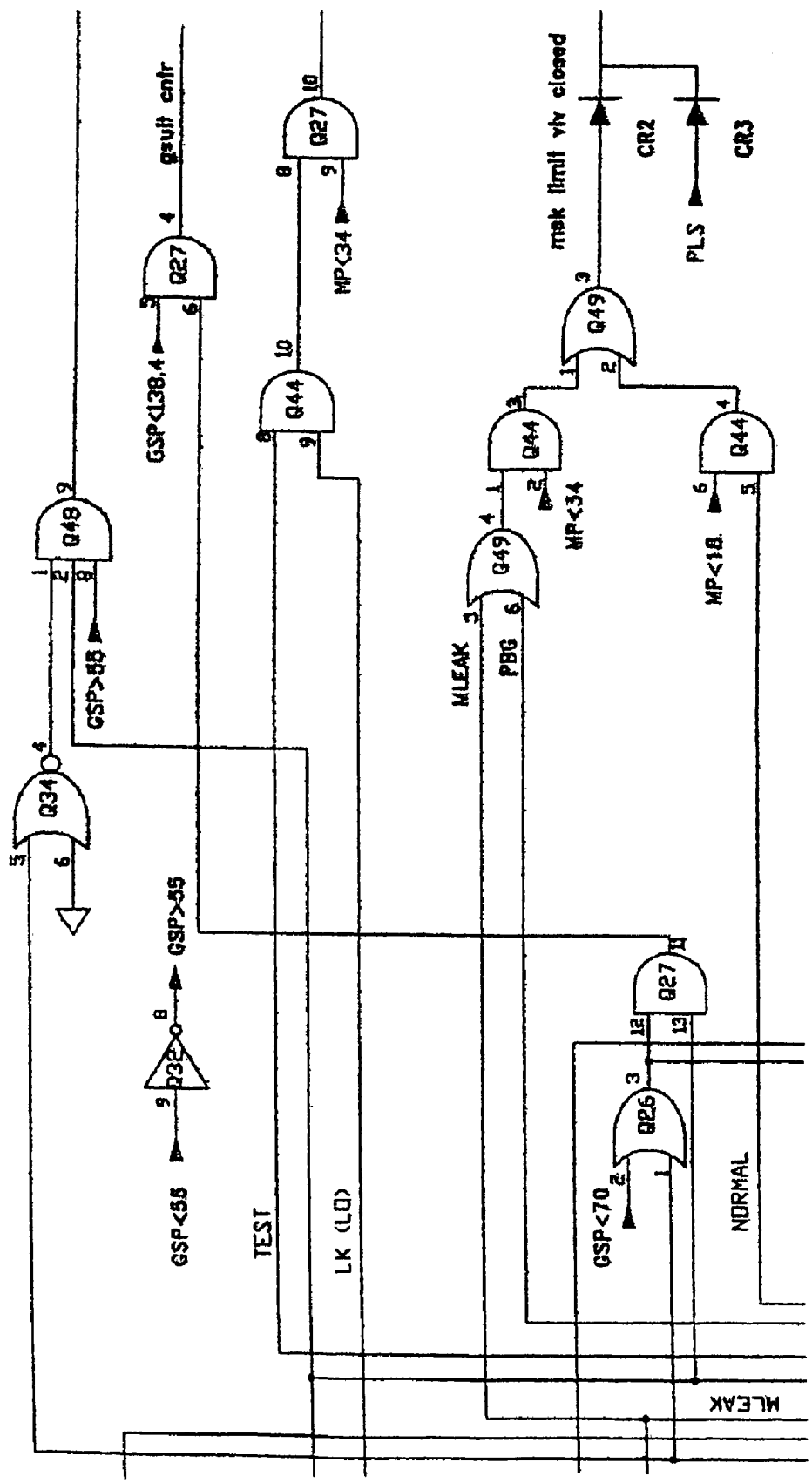
Figure 4I:
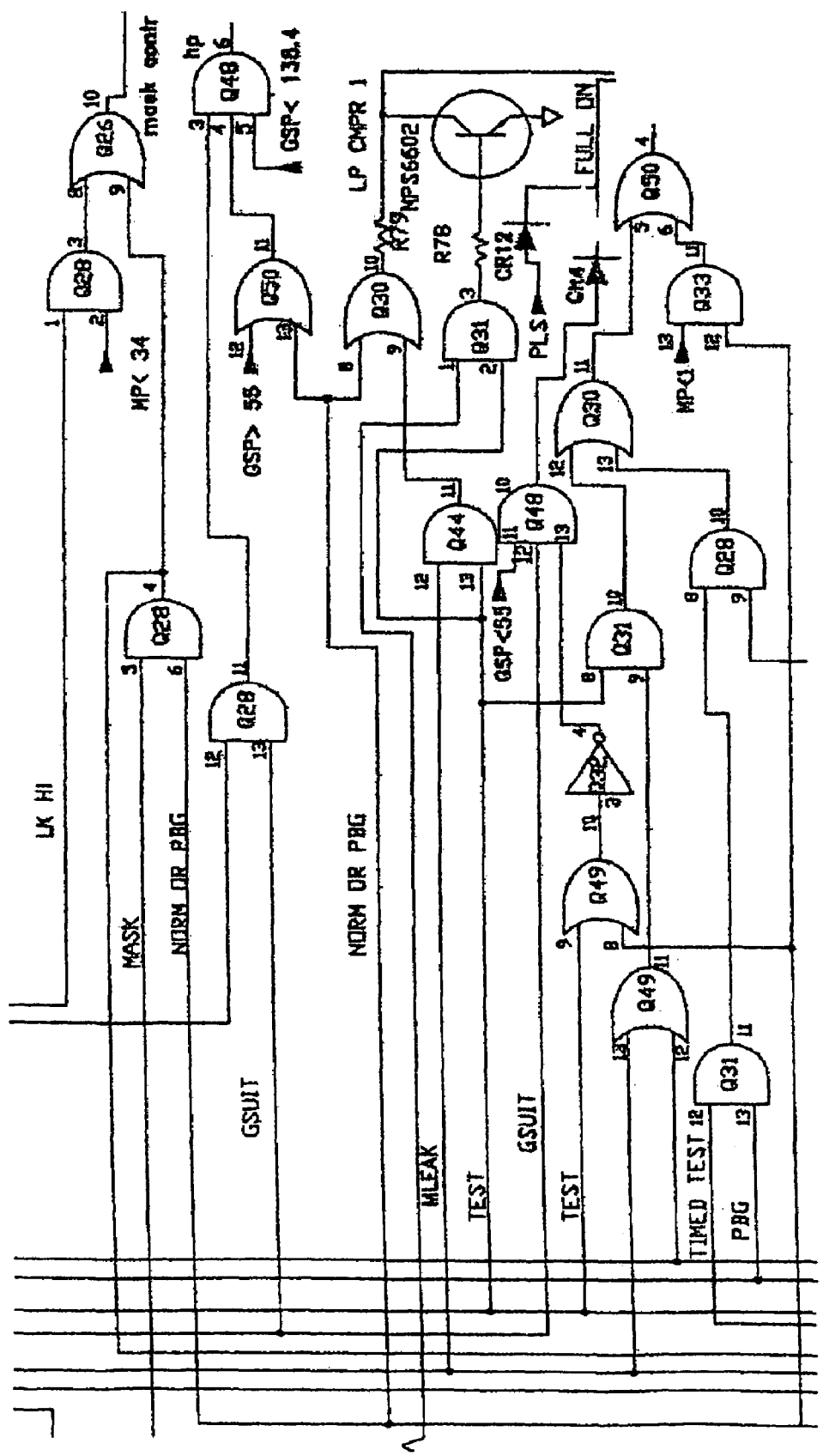
Figure 4J:
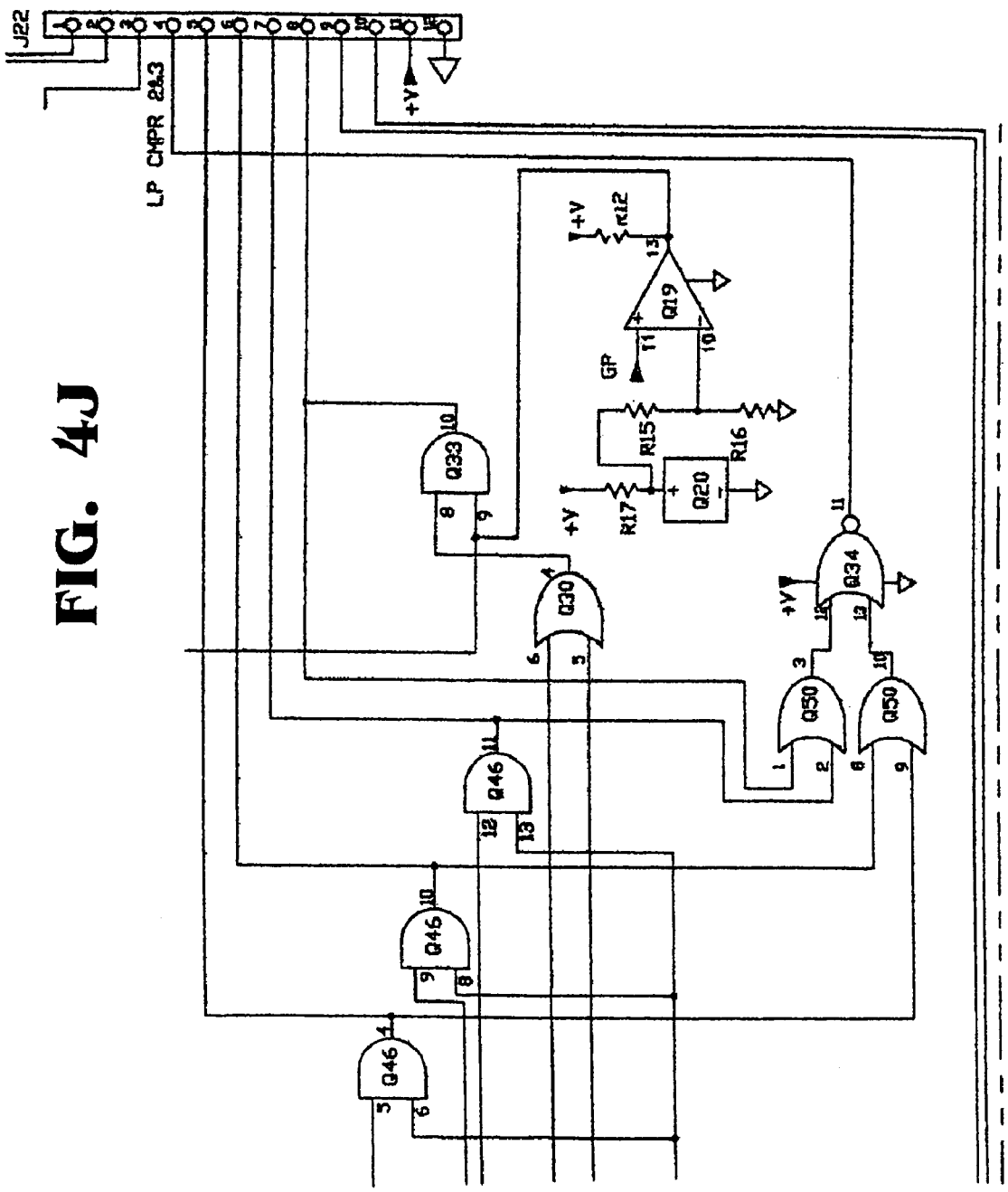
Figure 4K:
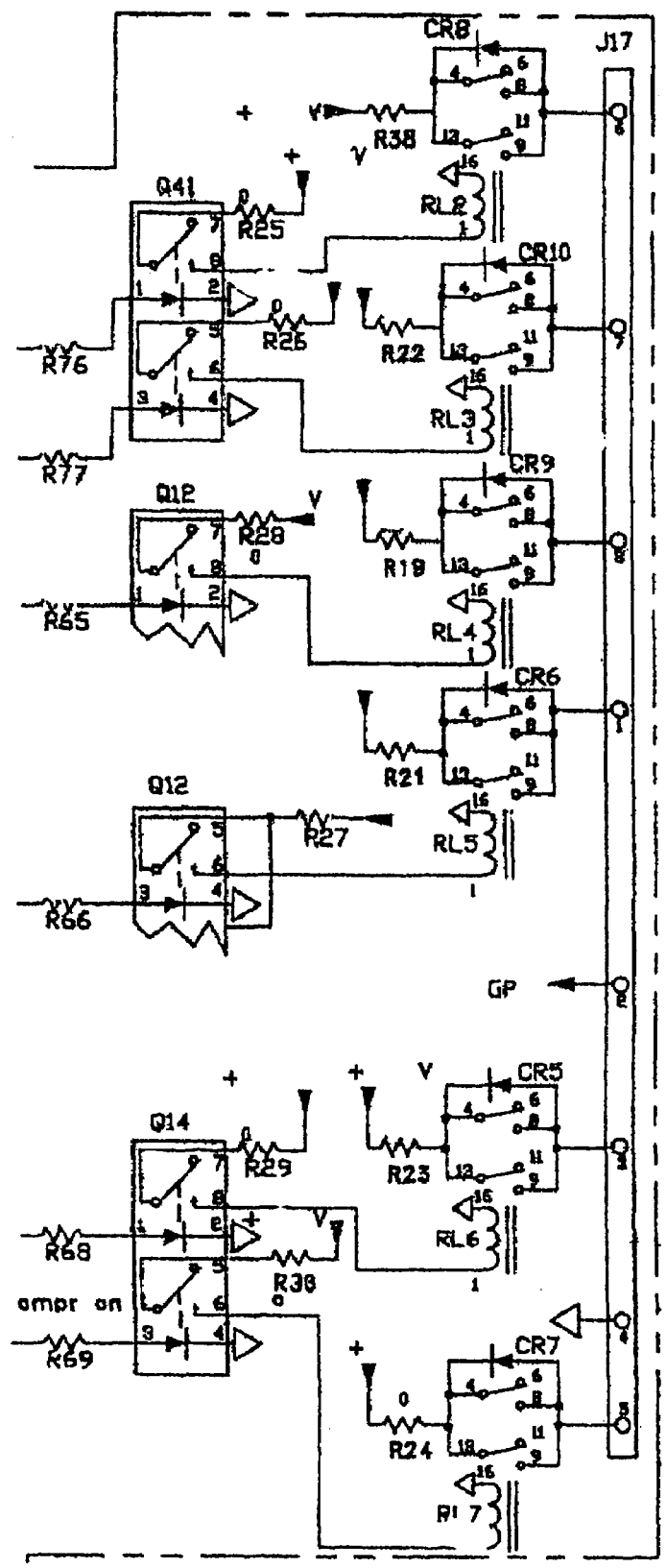
Figure 4L:
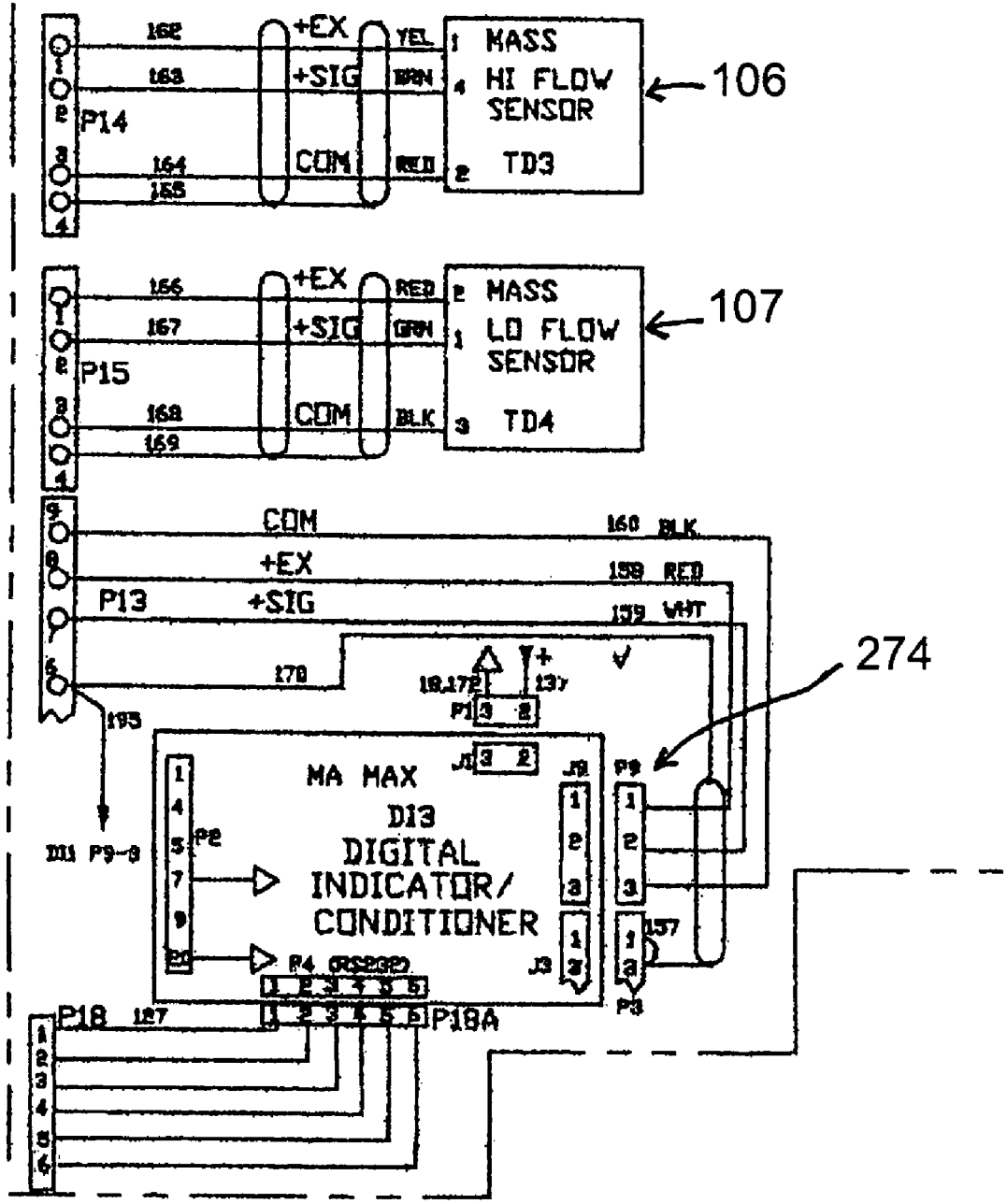
Figure 4M:
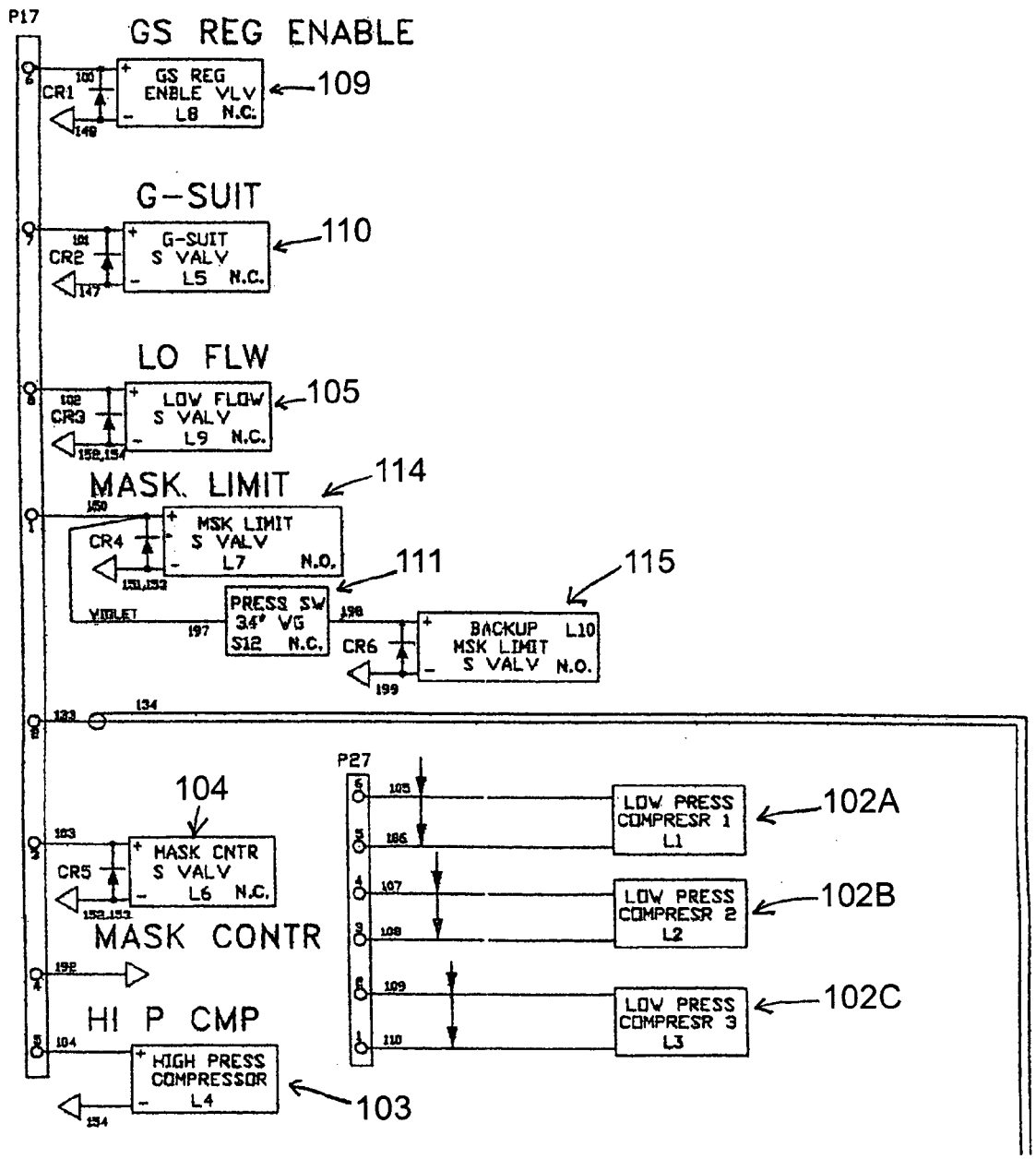
Figure 4N:
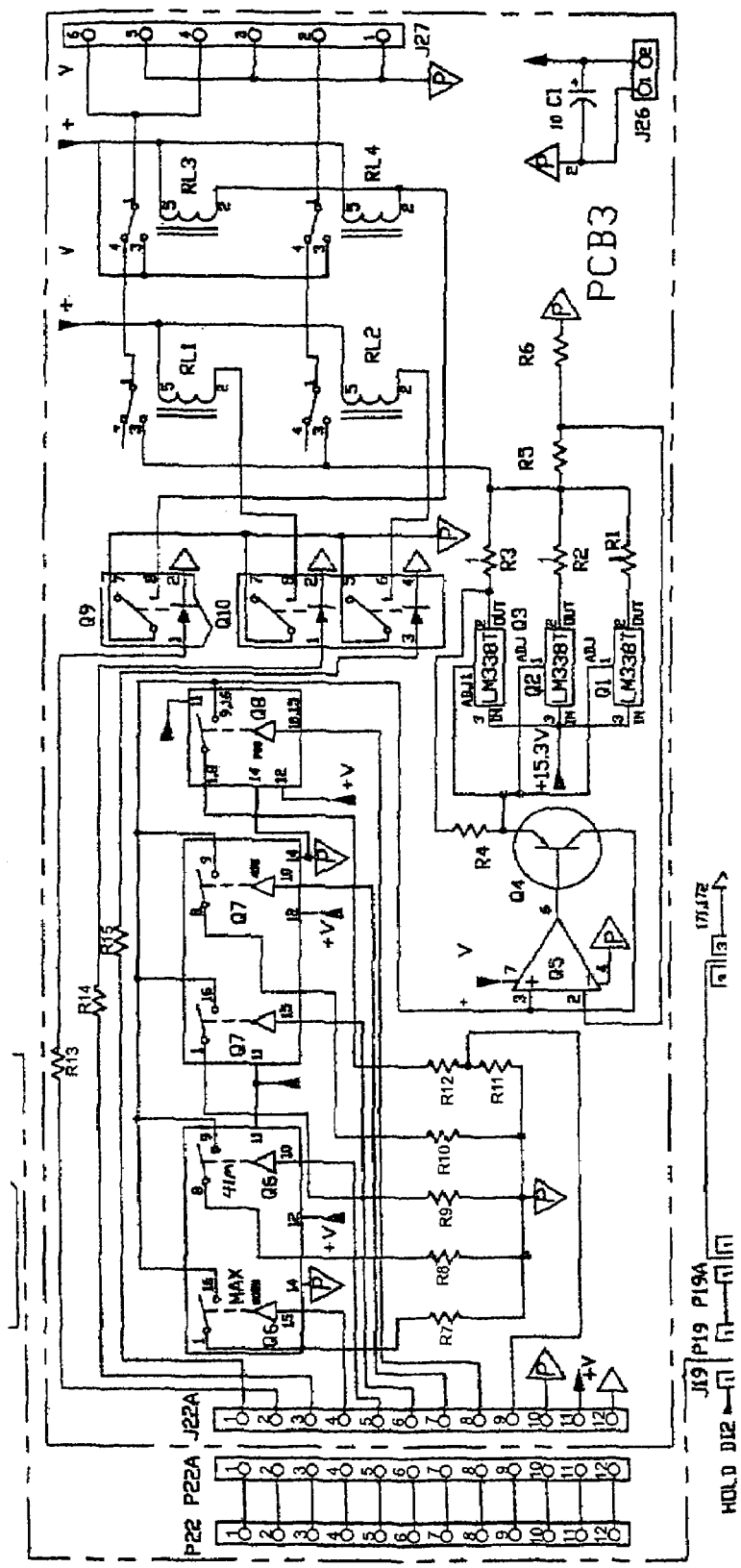
Figure 4O:
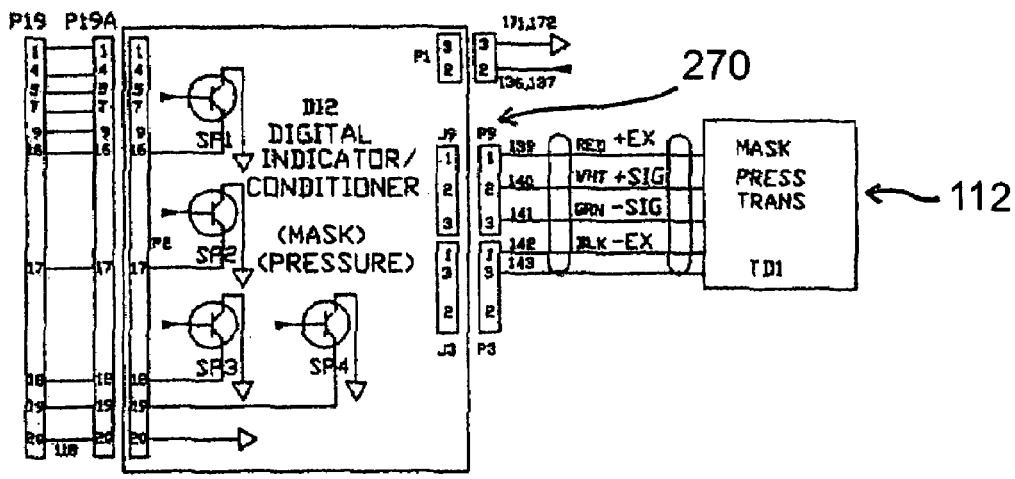
Figure 4P:
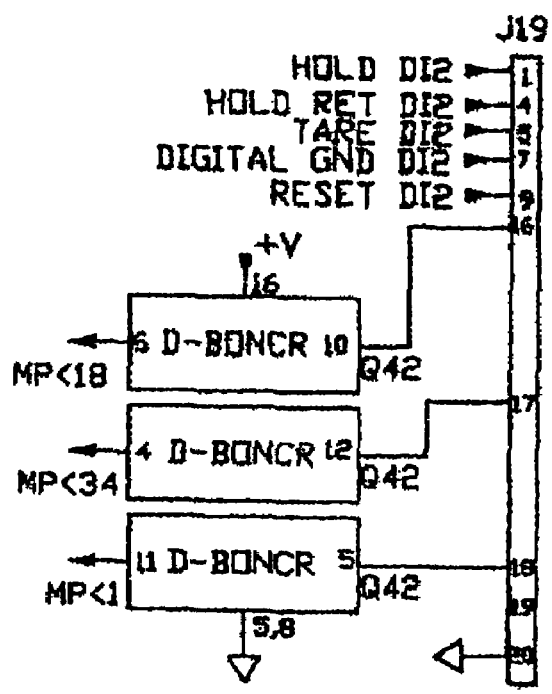
Figure 4Q:
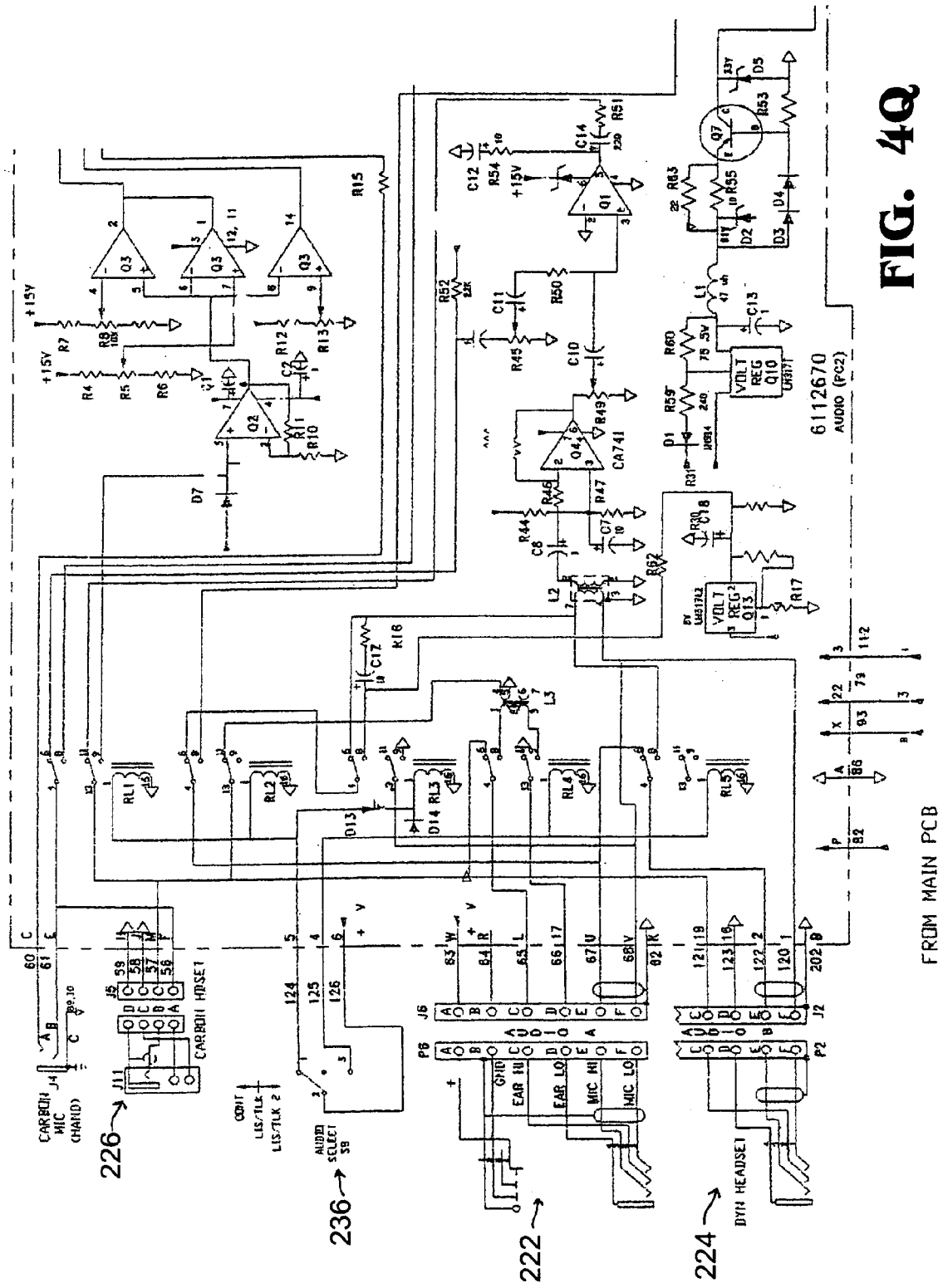
Figure 4R:
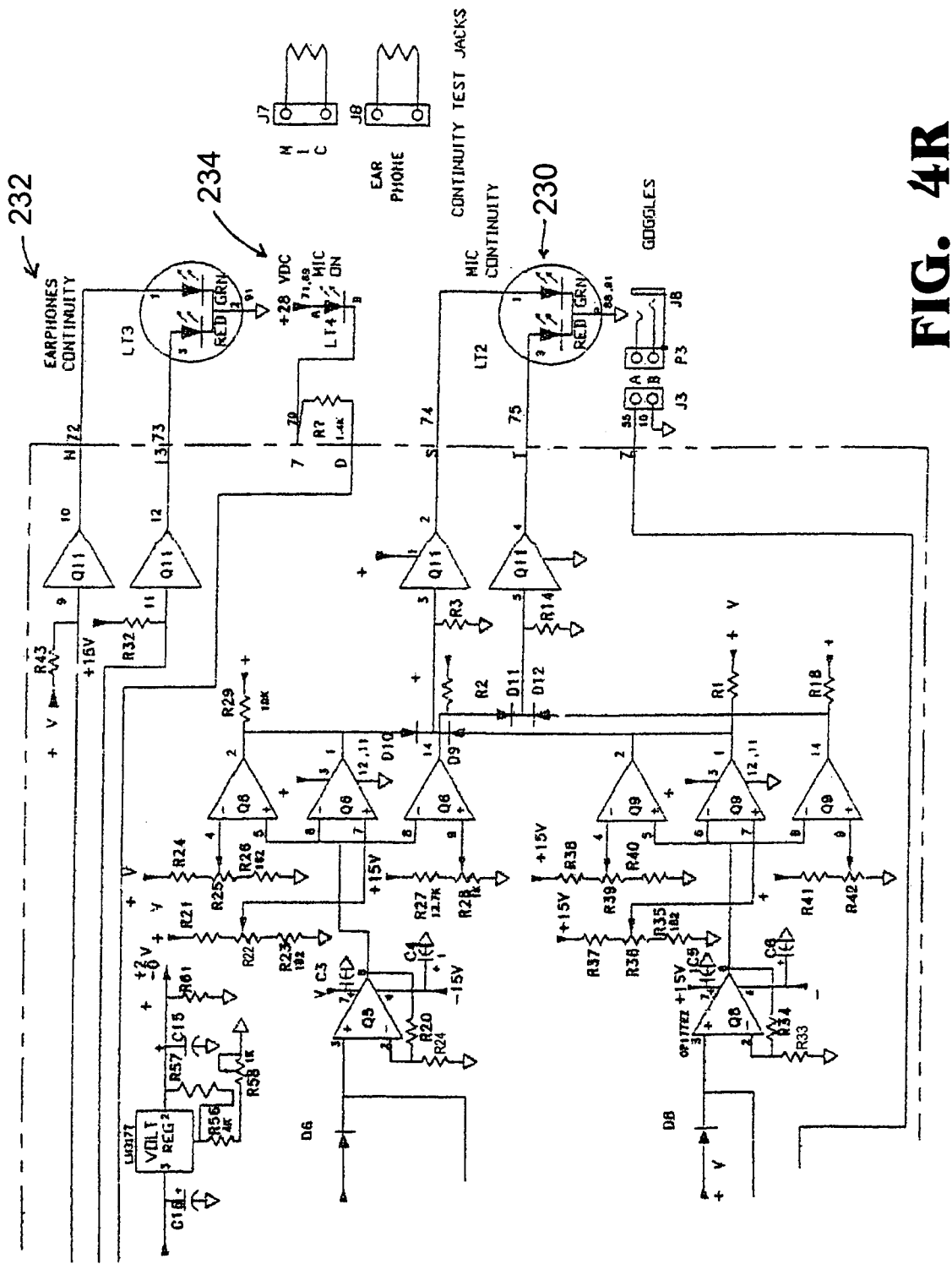
Figure 4S:
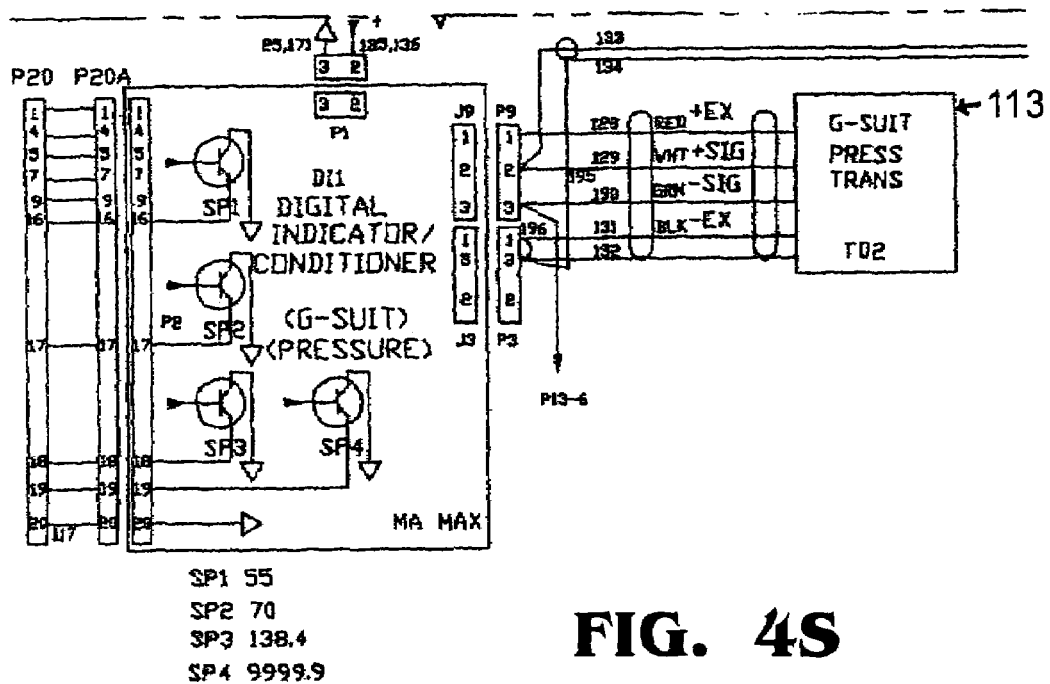

A mode select circuit includes the mode select switch 201, a momentary push button driving a Johnson Counter (also known as a twisted-ring counter) (see FIG. 4D). The Johnson counter provides the 'MASK' for the mask testing, 'LK-HI' for the high-leak testing, 'LK-LO' for the low leak testing, and 'LK-GS' for G-suit leak testing. It drives four buffers, which drive four LEDs (light emitting diodes) 201B, 201C, 201D, 201E, which indicate the mode that is selected. The pressure select circuit works the same way.

The test select circuit starts with a three-position toggle switch 203, which drive two de-bouncers. The de-bouncer outputs are the 'PBG' and 'normal' logic steps. (See FIG. 4F)

The press to test switch 204 and the G-suit switch 260 drive two de-bouncers. Their outputs are the 'TST' and 'GSUIT' logic steps.

With respect to the G-suit pressure sensor 113 and the mask pressure sensor 112, the output from the G-suit pressure sensor 113 is fed into a digital indicator 268. The indicator 268 turns the input voltage into a digital signal and processes it, resealing it into engineering units and outputting it in the form of a number presented on the indicator 268. It also provides a TTL logic high output at 55, 70 and 138.4 in $H_2O$. The indicator provides 10-volt excitation for the pressure transducer. The mask transducer (sensor) 112 works the same except it outputs TTL logic high outputs at 1, 18 and 34 in $H_2O$. (See FIG. 4, part O)

The G-suit regulator enable valve 109 is normally closed. It is turned on to vent the G-suit regulator 108 to regulate the G-suit pressure (GSP) to 60 in $H_2O$, which is the normal suit operating pressure. It is turned off when performing a G-suit leak test (LK-GS).

The G-suit control valve 110 is normally closed. In any mode select position other than 'LK-GS', the G-suit control valve 110 is turned on until the G-suit pressure reaches 70 in $H_2O$. In the 'LK-GS' position, the G-suit control valve 110 is turned on until the G-suit pressure reaches 138.4 in $H_2O$.

With respect to the low flow valve 105, this valve 105 is turned on until the mask pressure (MP) reaches 34 in $H_2O$ when the press to test switch 204 is pressed in the 'LK-LO' position The mask limit valve 114 is normally open. When the test select switch 203 is in 'normal', the mask limit valve 114 is closed when the MP (mask pressure) is less than 18 in $H_2O$. In the 'LK-HI' or 'LK-LO' or the test select in the 'PBG' position, the mask limit valve 114 is on until mask port pressure reaches 34 in $H_2O$.

The mask control valve 104 is normally closed. In the 'LK-HI' position, the mask control valve 104 is on until the mask pressure reaches 34 in $H_2O$. In the 'mask' position, the mask control valve 104 is on when the test select switch 203 is in the 'PBG' or 'normal' positions.

The backup mask limit valve 115 is normally open. It is closed at the same time the mask limit valve 114 is closed. Its power passes through the pressure switch 111. If the mask pressure exceeds 34 in $H_2O$, the pressure switch 111 opens to cut off power to the backup mask limit valve 115. The backup mask limit valve 115 opens to reduce the mask port pressure.

The 'High-Pressure Compressor' output turns on the high-pressure compressor 103 at 55 in $H_2O$ and off at 70 or 138.4 in $H_2O$. In the 'LK-GS' position, it turns off at 138.4 in $H_2O$.

The 'Low-Pressure Compressor 1' output turns on the low-pressure compressor 1 102a when the test select switch 203 is in either the PBG or 'normal' positions. If the mode select switch 201 is in the 'LK-HI' or 'LK-LO' position, the blower 102a is on. This is done to provide positive flow whenever the mask port is in use.

The 'Low-pressure Compressor2' output and the 'Low-Pressure Compressor 3' output turn on the low-pressure compressor 2 as '102b' in FIG. 1 and the low-pressure compressor 3 as '102c' in FIG. 1 when the test select switch 203 is in the 'normal' or 'PBG' position and the mask pressure drops below 1 in $H_2O$. When the test switch 203 is in the 'normal' and the mode select switch is 'LK-LO' or 'LK-HI' position, the low-pressure compressor 2 and 3 102b and 102c are turned on when the press to test switch 204 is pushed. When the test switch 203 is in the 'PBG', the low-pressure compressor 2 and 3 102b and 102c are turned on when the press to test switch 204 is pushed and, after one minute, these two low-pressure compressors 102b and 102c are turned off.

The 'Full ON' output is used to turn on the three low-pressure compressors 102a, 102b, and 102c of the low-pressure compressor system 102 at their maximum operating speed when they are used to inflate the G-suit. This output is high when the G-suit switch 260 is turned on if no output is required from the mask port. The 'Mask Port' output takes precedence over G-suit inflation.

If the 'Variable Speed Enable', '41 M Speed Enable', '43M Speed Enable' or '45M Speed Enable' is not turned on, the 'Normal Speed Enable' is on (high).

When 41 M is selected, the press to test button 204 is pushed, and the test select switch 203 is in the 'normal' or 'PBG' position, the '41 M Speed Enable' is on (high).

When 43M is selected, the press to test button 204 is pushed, and the test select switch 203 is in the 'normal' or 'PBG' position, the '43M Speed Enable' is on (high).

When 45M is selected, the press to test button 204 is pushed, and the test select switch 203 is in the 'normal' or 'PBG' position, the '45M Speed Enable' is on (high).

When 'LK-HI' or 'LK-LO' or 'PBG' with the press to test button 204 is pushed, the 'Variable Speed Enable' is on provided the G-suit pressure is greater than 55 in $H_2O$. The output from the G-suit pressure transducer (sensor) 113 is compared with a preset level to determine whether condition is being met.

The high-pressure compressor is turned on by the 'HP CMPR ON' signal. The 'HP CMPR ON' goes high when the G-suit switch is turned on and the following conditions are met; the G-suit pressure is greater than 55 in $H_2O$ but less than 138.4 in $H_2O$, and the G-suit pressure is less than 70 in $H_2O$ or 'LK-GS' mode selected.

The speed control PCB (PCB3) provides power to the three low-pressure compressors 102a, 102b and 102c. The power provided to the low-pressure compressors voltage is variable. This is done to vary the compressors output pressure. The low-pressure compressor 1 102a is turned off and on independently of the low-pressure compressors 2 102b and 3 102c. The speed control section outputs one of four fixed voltages or a variable voltage to the compressors that are turned on. Three adjustable voltage regulators tied in parallel supply the compressor voltage. Five external variable resistors set the regulators output voltage. (See FIG. 4N)

The speed control PCB (PCB3) has eight logic inputs. The logic inputs set the variable speed control and determine which compressors are turned on. The logic inputs are 'Full On', 'the Low-Pressure Compressor 1', 'the Low-Pressure Compressor 2 and 3', 'Normal Speed Enable', '41M Speed Enable', '43M Speed Enable', '45M Speed Enable', and 'Variable Speed Enable'.

The low-pressure compressor motor outputs include four power relays. Two power relays drive the low-pressure compressor 1 motor and the other two power relays drive the low-pressure compressor 2 and 3 motors. Opto isolators drive the power relays. This is done to protect the CMOS logic from inductive spikes that occurs when switching the motors. When the 'Full On' input goes high, one set of relays turns on, outputting 15 VDC (voltage of direct current) to all three low-pressure compressor motors 102a, 102b and 102c. When either or both of the second set relays turn on, the variable voltage from the voltage regulators is outputted to the appropriate motors. (See FIGS. 4M and 4N)

The pressure control 262 located on the control panel 200 is the variable resistor that is inputted to the speed control board. It is bypassed when the variable pressure switch 290 is in the 'CONST' position 290a causing the mask port pressure to stay at 16 in H2O. Otherwise the output pressure can be varied between 16 and 34 in H2O when the test select switch 203 is set to 'PBG'.

As part of preflight, the user verifies his or her communication equipment. The user attaches to the tester and talks into the microphone. The sound picked up by the microphone should be clearly heard with the earphones. Audio system is made up of a preamp and a power amp. Several different kinds of microphones can be inputted into the tester. There are four different microphone inputs. The primary input is 'audio A' 222. This input is configured to accept a 5-ohm dynamic microphone when the audio select switch 236 is in the LIS/TLK 1 (listen/talk) 236b. In the LIS/TLK 2 position 236c, it is configured to interface with an Electret microphone that requires 10-VDC (voltage of direct current) bias with 8 mA (milliamperes) current limit. In this position an audio input transformer and bias circuit is added to the input circuit. The output of the audio input transformer is fed into the preamp. There are two carbon microphone inputs parallel together. The two inputs are the carbon headset jack 226 and the PTT (Press to talk) talk jack 228. These inputs 226 and 228 have 24-VDC bias current limited to 10 mA. The input from the carbon microphone is fed directly to the power amplifier bypassing the preamp. The primary audio output is through the audio A jack 222. In the LIS/TLK 1 236b, it is setup to output into a 10-ohm dynamic microphone. In the LIS/TLK 2 position 236c, it is designed to output to 600 ohm input impedance earphones. The 'audio B' jack 224 is always configured to accept 5 ohm dynamic microphone and output to a 10 ohm dynamic load. The audio A jack 222 also provides +28 VDC (voltage of direct current) up to 200 mA power. It can be used to drive an ANR (Active Noised Reduction) unit.

A built in continuity tester can be provided to trouble shoot the communication gear. When the audio select switch 236 is in the 'cont' (continuity) position 236a, the communication circuits turn into a continuity tester. The carbon microphone, dynamic microphone and dynamic headset output DC resistance is monitored. If the dynamic microphone input resistance is between 4 to 7 ohms, the microphone light 230 will turn green. If it is less than 2 ohms, the microphone light 230 will turn red. If the output resistance is between 8 to 12 ohms, the earphone light 232 will turn green. If the output resistance is less than 2 ohms, the earphone light 232 will turn red. If the carbon microphone input resistance is between 80 to 500 ohms, the microphone light 230 will turn green. If it is less than 20 ohms, the microphone light will turn red. The input/output resistance of these three circuits is determined by holding the current through input/output constant. Now the resistance is directly proportional to the voltage. This voltage is amplified and fed into a window comparator and a limit comparator. The window comparators control the microphone/earphone green lights. If the comparators input voltage falls within the upper and lower set points, the green light will turn on. If the input voltage is less than limit comparator set voltage, the red light will turn on.

To perform a goggle test, the EEU-2P flash goggles or equivalent are attached to the tester. After 10 seconds, the PTT button 228 is pressed. The goggles will turn opaque if they are working. 28 to 32 VDC is supplied to the EEU-2P goggles through the goggle jack 238. This voltage has to be 27 VDC min (minimum voltage), when outputting 20 ma into 1400 ohm. The shorted output current must be 70 mA minimum and not more than 100 mA maximum. This is accomplished with voltage regulator and current limiting circuits.

Figure 5:
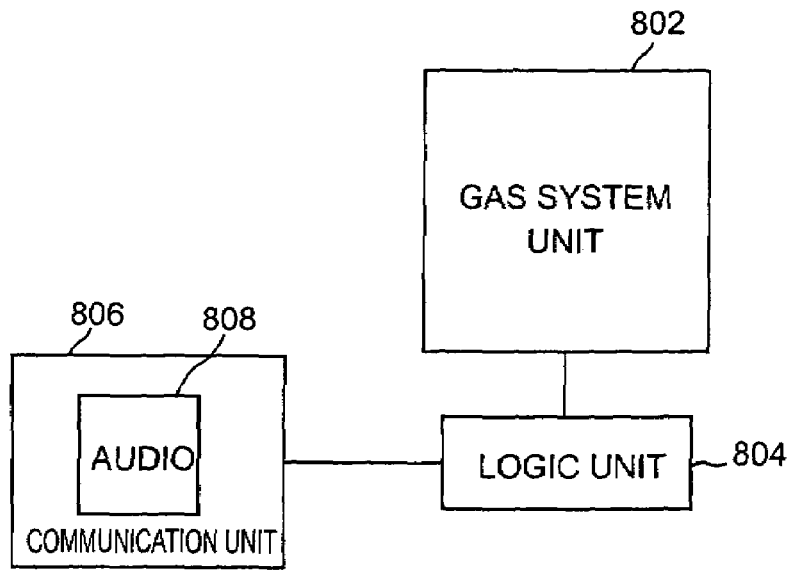
FIG. 5 illustrates a general block diagram of a portion of the present invention.

FIG. 5 illustrates a general block diagram of a portion of the present invention. The diagram includes a gas system unit 802 which includes elements such as valve and compressor units and a speed control unit (See PCB3). The gas system unit 802 is controlled by the main PCB (PCB1) which uses the logic unit 804 to control the overall operation (See FIG. 4). The logic unit 804 outputs control the speed control unit (See PCB3), and the valves that control the flow. The communication unit 806 is also included in the present invention and includes the audio unit 808 (See PCB2) which is connected to PCB1.

The present invention integrates a plurality of testers into one unit and yet requires less power than earlier systems. The unit runs on standard 115 or 230 VAC (voltage of alternating current), 47-440 Hz (hertz), 4 Amperes. Input requirements are 85-132/170-264 VAC 47-440 HZ (hertz) 400 W (watts). The mask port pressure/flow output schedule is shown by the following table:

TABLE 1

| Setting | @ 0 LPM in $H_2O$ | @ 5.0 LPM in $H_2O$ |
| --- | --- | --- |
| NORMAL | 3.25 | 1.75 ± .5 |
| 41M | 5.8 | 4.00 ± .5 |
| 43M | 8.25 | 6.00 ± .5 |
| 45M | 10.5 | 8.00 ± .5 |
| PBG | 16-32 | NA |
| LK HI | 16-32 | NA |
| LK LO | 16-32 | NA |

The tester 100 can be run from an internal rechargeable battery pack as an alternative to alternating current input from an outside source connected to for example the battery port 250. The battery pack can be nickel metal hydride batteries accessible through a weatherproof side panel. Other types of batteries such as lithium-ion and lithium-polymer can also be used. The power cord for outside power source can be attached to the back panel when the console is mounted. A built in charger can charge the tester in one hour or less or 20 minutes on the average. The tester can run up to 8 hours or more from its internal rechargeable battery pack. The duration can be increased depending on the type and size of the battery.

The G-Suit port output pressure is shown by the following table:

TABLE 2

| Setting | Output Press. in $H_2O$ |
| --- | --- |
| G-suit on | 58 ± 1 |
| G-suit leak test | 0-150 |

An example specification of the present invention (CAST) is described as follows.

The leak indication is shown by a leak above 5.5±0.5 lpm (liters per minute). The flow indication is 0-10,000±25 sccm and 0-300±1 sscm. The pressure drop leak range is 0-5 lpm. The temperature limits for the operating range is 0° C. to 50° C. while for storage is −40° C. to 75° C. The flash goggle power is 28+2 VDC (voltage of direct current), 70-100 ma (milliamperes), current limited to 100 ma (milliamperes) maximum. The active noise reduction (ANR) power is +28±4 VDC (voltage of direct current) 200 ma (milliamperes) minimum. The microphone input current is 8 mA (milliamperes) maximum at 10 VDC (voltage of direct current).

With this configuration, the present invention can test all the aircrew's life support equipment. The present invention does not require anything more than commonly available local power to operate. The present invention is able to operate in a chemical warfare environment. The present invention does not require a separate high-pressure source of breathing air/oxygen. The present invention significantly reduces supporting man-hours, deployment costs and mobility footprint.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A method of operating a gas system, comprising the steps of:
   in a gas system which includes a first system and a second system connectable to test aircrew systems, selecting from among one of a test mode simulating normal human breathing and a test mode simulating pressure human breathing while under gravitational forces greater than occurring during said normal breathing;
   filtering ambient air with a chemical filter;
   compressing the air;
   monitoring a flow of the air; and
   during said test mode, selectively monitoring pressure of the air in said flow through said first system and said second system;
   wherein said first system comprises a mask, and said second system comprises a G-suit; and
   wherein, when said test mode for said pressure breathing is selected, the step of compressing said air further comprises the steps of:
   turning on a first compressor;
   turning off said first compressor and turning on a second compressor when a pressure of said G-suit reaches a first predetermined point; and
   turning off said second compressor when said pressure of said G-suit reaches a second predetermined point.

2. The method of claim 1, wherein, when said test mode for said normal breathing is selected, the step of compressing said air further comprises the step of turning on a first compressor.

3. The method of claim 1, wherein said first predetermined point is about 55 inch $H_2O$, and said second predetermined point is about 70 inch $H_2O$.

4. The method of claim 1, said first compressor comprising a first blower, a second blower, and a third blower connected in series.

5. The method of claim 4, said step of compressing said air further comprising the step of:
   controlling said first compressor by adjusting a voltage applied to each of said first, second and third blowers and by deciding a number of the blowers to be turned on.

6. A method of testing aircrew systems, comprising the steps of:
   conducting a first test by applying air to a mask at a first pressure;
   dressing a user in a G-suit;
   conducting a second test of the mask at a second pressure higher than said first pressure while the G-suit is not inflated;
   inflating the G-suit; and
   conducting a third test of the mask at a third pressure while the G-suit is inflated, said second pressure being lower than said third pressure.

7. The method of claim 6, wherein said first pressure is from about 1 inch $H_2O$ to about 10 inch $H_2O$, said second pressure is about 16 inch $H_2O$, and said third pressure is about 32 inch $H_2O$.

8. The method of claim 7, the second test further comprising the steps of:
   verifying a function of said mask; and
   verifying that a vest starts to inflate.

9. The method of claim 8, further comprising the steps of:
   opening a first flow valve for directing all of a flow of air to a first flow sensor, said first flow sensor sensing 0 to approximately 10,000 cubic centimeters per minute; and
   checking for a leak of the air from said flow by detecting the flow with said first flow sensor.

10. The method of claim 8, further comprising the steps of:
    opening a second flow valve for directing all flow to a second flow sensor, said second flow sensor sensing 0 to approximately 300 cubic centimeters per minute; and
    checking for a leak of the air from said flow by detecting the flow with said second flow sensor.

11. The method of claim 9, the step of conducting the third test further comprising the steps of:
    increasing a pressure to about 32 inch $H_2O$; and
    conducting said third test at said third pressure with the G-suit inflated.

12. The method of claim 11, wherein inflating of said G-suit comprises the steps of:
    applying to the G-suit air provided by turning on a first compressor to a maximum operating speed thereof;
    turning off said first compressor and turning on a second compressor when the G-suit attains a first predetermined pressure; and
    turning off said second compressor when the G-suit attains a second predetermined pressure.

13. The method of claim 12, wherein said first predetermined pressure is about 55 inch $H_2O$, and second predetermined pressure is about 70 inch $H_2O$.

14. The method of claim 13, further comprising the steps of:
increasing said pressure within the G-suit to about 138.4 inch $H_2O$;
detecting a change in said pressure within the G-suit over an interval of time; and
calculating a leak rate in dependence upon said change in said pressure within the G-suit over said interval of time.

15. A method of testing aircrew systems, comprising the steps of:
conducting a first test by applying a flow of air to a mask at a first pressure;
dressing a user in a G-suit;
conducting a second test of the mask at a second pressure higher than said first pressure while the G-suit is not inflated;
inflating the G-suit with a flow of gas provided by a system comprising a first compressor and a second compressor; and
conducting a third test of the mask at a third pressure while the G-suit is inflated, said second pressure being lower than said third pressure.

16. The method of claim 15, wherein the step of inflating said G-suit comprises the steps of:
turning on said first compressor;
turning off said first compressor and turning on said second compressor when the G-suit attains a first predetermined pressure; and
turning off said second compressor when the G-suit attains a second predetermined pressure.

17. The method of claim 16, wherein said first predetermined pressure is about 55 inch $H_2O$, and said second predetermined pressure is about 70 inch $H_2O$.

18. A method of operating a gas system, comprising the steps of:
in a gas system which includes a first system and a second system connectable to test aircrew systems, selecting from among one of a test mode simulating normal human breathing and a test mode simulating pressure human breathing while under gravitational forces greater than occurring during said normal breathing;
filtering ambient air with a chemical filter;
compressing the air;
monitoring a flow of the air; and
during said test mode, selectively monitoring pressure of the air in said flow through said first system and said second system;
wherein said step of compressing the air is carried out by turning on a compressor; and
wherein said compressor comprises a first blower, a second blower and a third blower connected in series, and said compressor is controlled by adjusting a voltage applied to each of said first blower, said second blower and said third blower, and by deciding a number of the blowers to be turned on.

* * * * *